United States Patent [19]

Ward

[11] Patent Number: 5,024,315
[45] Date of Patent: Jun. 18, 1991

[54] METHOD OF DISTRIBUTING WORKPIECES BETWEEN A CONVEYOR AND WORKSTATIONS

[75] Inventor: William R. Ward, Columbus, Ohio

[73] Assignee: O-I Neg TV Products, Inc., Toledo, Ohio

[21] Appl. No.: 223,454

[22] Filed: Jul. 22, 1988

Related U.S. Application Data

[62] Division of Ser. No. 766,721, Aug. 19, 1985, Pat. No. 4,760,671.

[51] Int. Cl.$^5$ ............................................. B65G 43/00
[52] U.S. Cl. .................................. 198/341; 198/346.2; 414/225
[58] Field of Search .................. 198/346.2, 341, 346.3, 198/358, 366, 370, 372, 968.4, 471.1, 803.5; 51/3, 215 R, 215 AR, 215 E, 235; 414/222, 225, 744.2, 744.3, 744.8

[56] References Cited

U.S. PATENT DOCUMENTS

| | | | |
|---|---|---|---|
| 3,860,125 | 1/1975 | Johnson et al. | 198/346.2 X |
| 4,144,960 | 3/1979 | Scourtes | 198/346.2 |
| 4,382,500 | 5/1983 | Oyama et al. | 198/346.2 X |
| 4,561,060 | 12/1985 | Hemond | 198/341 X |
| 4,564,102 | 1/1986 | Mori et al. | 198/341 |
| 4,630,216 | 12/1986 | Tyler et al. | 198/358 X |
| 4,674,181 | 1/1987 | Hamada et al. | 901/7 X |
| 4,760,671 | 8/1988 | Ward | 198/346.2 X |

Primary Examiner—D. Glenn Dayoan

[57] ABSTRACT

A workpiece manipulating apparatus for faceplate panels of cathode ray tubes includes a conveyor for carrying panels along two groups of grinder stations in a pattern coordinated with carriage mounted loaders which move along the conveyor. The conveyor indexes to loading stations as do the loaders. Unground panels are sequenced to the stations as the loaders are present. Loaders pick the unground panels from the conveyor and transfer them to an orienting station which orients panels for loading into a grinder. Loaders pick an oriented panel from the orienting station and load it in to the grinder at the loading station. They also picks up ground panels from the grinder and place them in a reorient station and picks ground panels from the reorient station and places them on the conveyor in the position from which they removed an unground panel. The loader advances to a next loading station to load a next grinder and the conveyor with panels picked up at the preceeding station. The cycle is continuous with the panel manipulation through a complete cycle approximating the grinding time of a panel in a grinder.

13 Claims, 13 Drawing Sheets

METHOD OF DISTRIBUTING WORKPIECES BETWEEN A CONVEYOR AND WORKSTATIONS

This is a division of application Ser. No. 766,721 filed Aug. 19, 1985, now U.S. Pat. No. 4,760,671.

BACKGROUND OF THE INVENTION

1. Field of the Invention

This invention relates to methods of and apparatus for automatically grinding cathode ray tube (CRT) faceplates, and more particularly, to methods and apparatus for assigning and delivering CRT faceplates to designated ones of a plurality of grinding machines, identifying the machine in which a CRT faceplate is ground, loading the CRT faceplate into the machines, and removing CRT faceplates from the machines.

2. Description of the Related Art

Heretofore, it has been known to grind the outer surface of the faceplates of CRTs to improve the optical quality of the images formed upon the faceplates. Such grinding operations have been performed in grinding machines of various forms including machines, hereinafter designated "singlehead grinders", having a single elastomeric wheel, rotating around a generally horizontal axis, and to which a slurry of abrasive is fed while a carriage is traversed in a generally horizontal plane to carry a rotating CRT faceplate chuck beneath the wheel so that the wheel rides over the contour of a suitably chucked faceplate. In production, an aligned array of singlehead grinders are positioned adjacent a conveyor for CRT faceplates which furnishes raw or unground faceplates to the area and carries ground faceplates from the area. An attendant transferred faceplates from the conveyor to the singlehead grinder, seated them properly in the neat blocks of the grinder chucks, started the grinder after it was properly loaded, and returned to remove the ground faceplate and placed it on the conveyor at the end of the grinder cycle. Since the grinding cycle consumed more time than the faceplate transfers, the attendant was usually assigned to service a plurality of grinders.

Significant time was lost in the manual loading and unloading of the grinders. Ware was occasionally passed through the grinding station without being transferred to the grinders. As CRT faceplates have become larger, the ware is quite heavy and it has become difficult to load into and remove from the grinders. Production rates are dependant upon the skill, strength and endurance of the machine attendants.

SUMMARY OF THE INVENTION

An object of the present invention is to improve the manufacture of CRT faceplates, to increase the uniformity of processing, to increase the speed of loading and unloading grinders and to reduce the cost of manufacture of high quality CRT faceplates. Further, objects are to reduce the labor of attending the grinding of faceplates, to enhance the accuracy of loading a faceplate into a grinder and to identify the ground faceplates with the grinding machines upon which they were ground.

In accordance with the above objects, a feature of this invention is a CRT faceplate handling method and system adapted to receive faceplates, load them on a conveyor, mark them with an identification code for the grinding machine to which they are assigned, orient them on the conveyor for transfer to the assigned grinding machine, advance them along a path adjacent a plurality of grinding machines and transfer them between the conveyor and the assigned grinding machine. Transfer of CRT faceplates is accomplished by a transfer mechanism which picks up a faceplate on the conveyor and a ground faceplate in a grinder machine simultaneously, transfers the faceplates to carrier stations, advances along the conveyor to a position adjacent another grinder machine, transfers the unground faceplate on its carrier station into the adjacent grinder machine while removing a ground faceplate from that machine and transfers the unloaded ground faceplate to a carrier station which has been vacated by a previously ground faceplate which is transferred to the conveyor at a location from which an unground faceplate had been removed to the transfer mechanism carrier station for unground faceplates.

The transfer mechanism is on a carriage, the motion of which is programmed to pick up an unground faceplate which has been preassigned to the next following grinder machine in the carriage motion program. The conveyor is programmed to present an assigned CRT faceplate to the station immediately preceeding the grinder machine into which the faceplate is to be loaded and to handle faceplates for the entire system.

The number of grinders serviced by a system and the speed of the conveyors and transfer mechanisms is advantageously matched to the time interval of a grinder machine so that a carriage with its transfer mechanism is positioned adjacent the machine and poised to unload and reload the machine with raw ware as it concludes its grinding cycle. In a disclosed arrangement two carriage mounted transfer mechanisms are positioned on opposite sides of a conveyor having a row of grinder machines on each side. The transfer mechanisms travel between the conveyor and the grinding machines. One transfer mechanism loads half of the machines on the side which it services before the cycle of the other transfer mechanism is initiated and when the system is in full operation the transfer mechanisms operate out of phase by one half their respective service cycles.

Drive motors are provided for the conveyor to index CRT faceplates to the centerlines of grinder machines aligned with each other across the longitudinal dimension of the conveyor. Electric motors also drive the carriages of the transfer mechanisms to center those mechanisms on the grinder machine centerlines. The transfer functions of the transfer mechanism are driven by electric motors and pneumatic cylinders. Conveyor loading and CRT faceplate marking and positioning are also driven by pneumatic cylinders. All of these mechanisms have controls the operation of which is coordinated by a master control which may be a programmable controller.

BRIEF DESCRIPTION OF THE DRAWINGS

The above and additional objects and features of this invention will be appreciated more fully from the following detailed description, when read with reference to the accompanying drawings, in which.

DESCRIPTION OF THE PREFERRED EMBODIMENT

Figure 1:
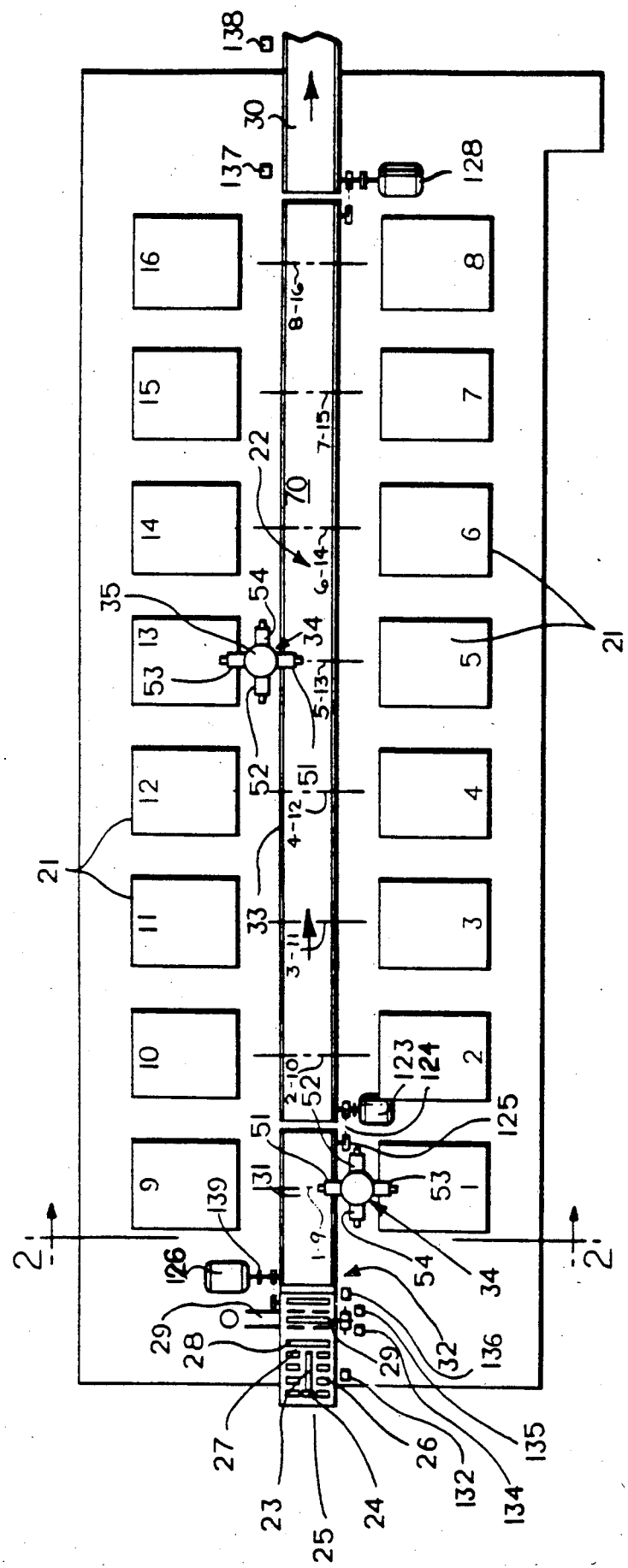
FIG. 1 is a schematic plan view one arrangement of the conveyor-marker-loader-grinder apparatus of this invention.

A schematic layout of the apparatus of this invention is shown in FIG. 1 as applied to sixteen grinder machines 21 arranged in two rows of eight machines, one on each side of a conveyor 22 for CRT faceplate panels to be ground in the system. A loading cradle 23 is located at the input end of conveyor 22 and is arranged as a paddle pivoted at its lead end 24 below the conveyor surface so that its down stream portion extends at about a sixty degree inclination to the conveyor ware support surface.

Conveyor 22 comprises several sections, a feed section 32, a main section 33, and a delivery or output section 30. Feed conveyor 32 coordinates the introduction of CRT faceplates to be ground in the system with the operation of the remainder of the system's elements. A loading section 25 of conveyor 32 is made up of slave driven rollers. The rollers 26 adjacent the loading cradle 23 extend from each side of the conveyor bed edge to a cavity 27 between those rollers into which the loading cradle 23 is depressed as it is pivoted to deposit a panel on the loading section 25. The rollers 28 down stream of rollers 26 extend the full width of the conveyor bed from the cradle through a marker-positioner station 29 to a belt conveyor section 31.

Marker-positioner station 29 includes apparatus to pick up a CRT faceplate on the fly as it is advanced on rollers 28 and raise the faceplate to a position at which a coded identification of the grinder to which the faceplate is assigned is applied to the skirt of the faceplate. Such coded markings can be applied through elastomeric masks pressed against the faceplate skirt as by sand blasting (by means not shown). The station 29 also includes chucks which are closed upon the faceplate while it is lifted free of the conveyor to orient it for replacement on the conveyor in a position for handling in subsequent manipulations (by means not shown).

Feed conveyor 32 is driven in the roller and belt portions as a slave to main conveyor 33, which is of the belt type, by means of a chain drive and a clutch coupling it to the main conveyor so that the feed conveyor 32 and main conveyor 33 function as a single continuous conveyor when coupled. Alternatively the feed conveyor 32 is declutched from the main conveyor and driven by its own motor and control.

Conveyors 32 and 33, when coupled, function as a single continuous conveyor which is indexed to advance CRT faceplate panels returned to the feed conveyor 32 at marker-positioner station 29 to the several grinder machine stations. In the illustrated arrangement, the first grinder machines of the groups on each side of the feed conveyor 32 are positioned with the centerlines normal to the longitudinal dimension or conveying direction of the conveyor and coincident. This coincident centerline arrangement is maintained for opposed grinder machines of the remainder of each machine group which are adjacent the main conveyor 33. The grinder machine stations on the conveyor are such that the CRT faceplates adjacent the conveyor are stopped centered on the grinder machine centerlines. Grinder machine centerlines are spaced equally along the conveyor and the spacing from the marker-positioner station 29 to the firs grinder machine station is equal to the spacing of adjacent centerlines. The conveyor sections index in increments of the spacing of adjacent centerlines or multiples thereof.

In order to facilitate further discussion of the system and its functions, the grinder machines 21 will be designated as machines 1 through 8 on the righthand side of the conveyor 22 as viewed in the conveying direction and as machines 9 through 16 on the lefthand side. With such designations, the coincident machine centerlines extending across the conveyor will represent the stations to which CRT faceplates panels are advanced by the conveyor or carried by the loaders. The eight stations are identified by their machine numbers based upon the centerlines as stations 1-9, 2-10, 3-11, 4-12, 5-13, 6-14, 7-15, 8-16. In discussing the manipulation of individual panels, the stations for the panels on the indexing conveyor are referenced from the marker-positioner station in station-to-station increments such as a one increment indexing of feed conveyor to station 1 or a two increment indexing to station 2 from the marker-positioner when the panel is assigned to one of the righthand group of grinders 1 through 8. When the panel is to be processed by a machine on the left, those on the set 9 through 16, the first station to which they are advanced will be designated as station 9 for a single increment index and station 10 for a double increment index. It should be appreciated that station 9 is coincident with station 1 on the conveyor and station 10 is coincident with station 2. Since the loaders are individual to the group of machines they service, their locations will be designated by the machine centerline on which they are centered as loader stations 1 through 8 for the righthand loader stations and 9 through 16 for the lefthand loader.

Figure 2:
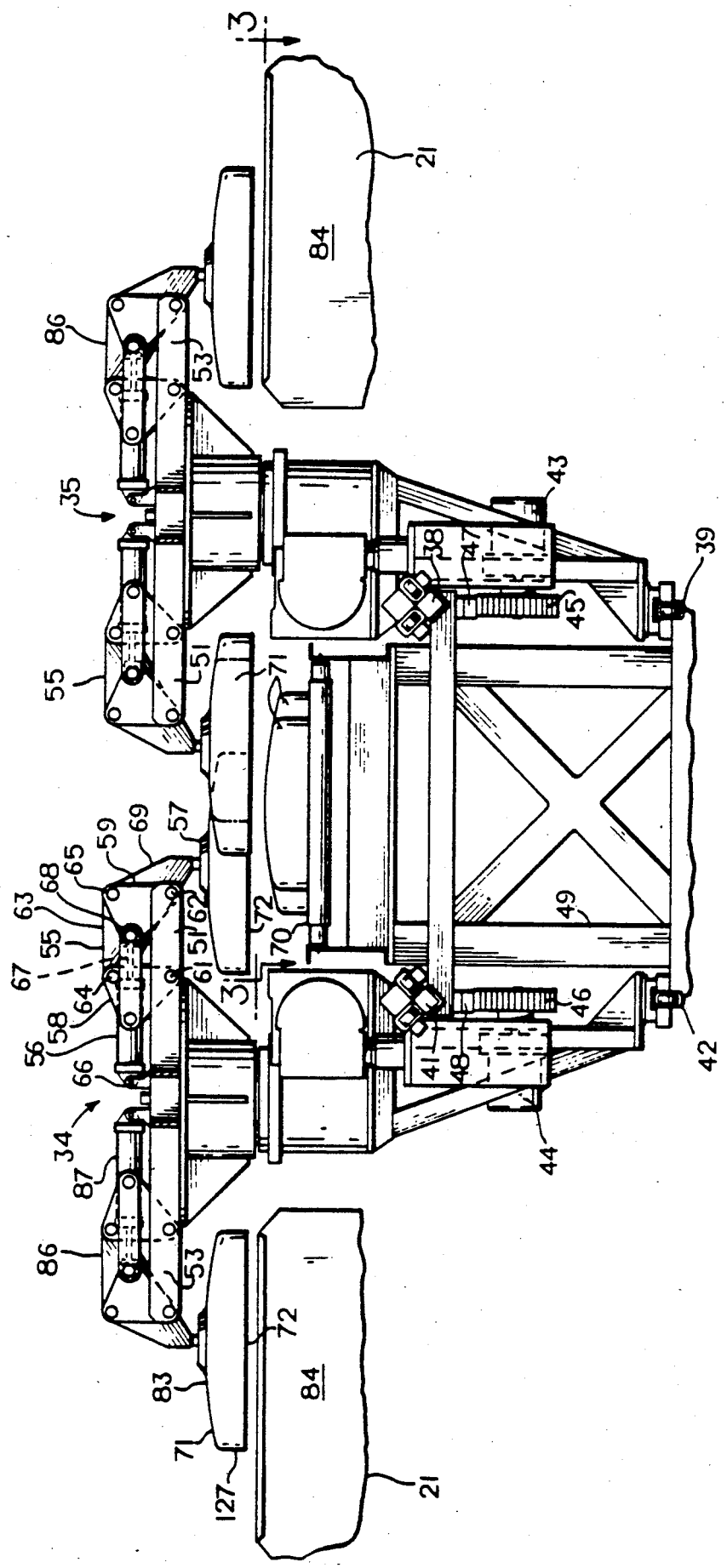
FIG. 2 is a fragmentary sectional view of the apparatus of FIG. 1 taken along the line 2—2 of FIG. 1 showing loaders which have positioned CRT faceplates above the conveyor and the grinder machines, the loaders having their orient and reorient stations, cooperating homestation arms, and panel lifting and holding mechanisms removed for illustrative purposes.

A first grinder machine 21 of each group of machines, machine 1 and machine 9, is located along the side of the feed conveyor 32. The remaining seven grinder machines 21 of each group, machine 2 through 8 and 10 through 16, are located along the sides of the main conveyor 33. Transfer of CRT faceplates or panels from the conveyor deck or belt 40 to the grinders is by means of loaders 34 and 35 for the righthand and lefthand group of machines 21 respectively (as viewed along the direction of conveyor advance) each having a carriage 36 and 37 which is adapted for movement along the conveyor between the conveyor 22 and the machines 21 on rails 38, 39 and 41, 42 as best seen in FIG. 2. The carriages are driven by individual motors 43 and 44 which drive a pinion 45 and 46 engaging a rack 47 and 48 mounted on and extending along the conveyor base frame 49 from stations 1-9 to 8-16. Suitable controls cause the drive motors to advance the carriages along the conveyor to position the loader axis on the centerline of the grinder machine 1 through 8 or 9 through 16 with which it is programmed to function.

The loaders 34 and 35 each have four arms 51, 52, 53 and 54 which are in quadrature and which are normal to a generally vertical axis in the carriage and are rotatable about the axis through an arc of 90° from a home position to a deliver position. In the illustrative example, each loader advances its arms clockwise from the home positions, a forward index, and returns its arms from the delivery positions to the home positions with counterclockwise motion, a reverse index. The arms are above the level of the conveyor deck and the grinder machine faceplate supporting surfaces which are essentially at the same level.

Conveyor unloading arm 51 has a home position extending toward the conveyor normal to the conveying direction and carries a four bar linkage mechanism 55 driven by a pneumatic cylinder 56 to move a vacuum cup 57 faceplate pickup head over and down upon a faceplate on the conveyor.

The four bar linkage comprises two bell cranks 58 and 59 pivoted on arm 51 at 61 and 62 coupled by a link 63 pivoted at 64 and 65. Drive cylinder 56 is pivoted at its blind end on the loader at trunion 66 and has its piston rod 67 pivoted to crank 59 at 68. Vacuum head mount bracket 69 is integral with link 63 and is maintained with an axis of the vacuum head and cup 57 vertical throughout its translation between its retracted and extended positions by the four bar linkage 55 so that a CRT faceplate 71 maintains its seal edge 72 in a generally horizontal plane as it is engaged and lifted from the conveyor deck 70. The delivery position of arm 51 is above an orienting station 73.

Figure 3:
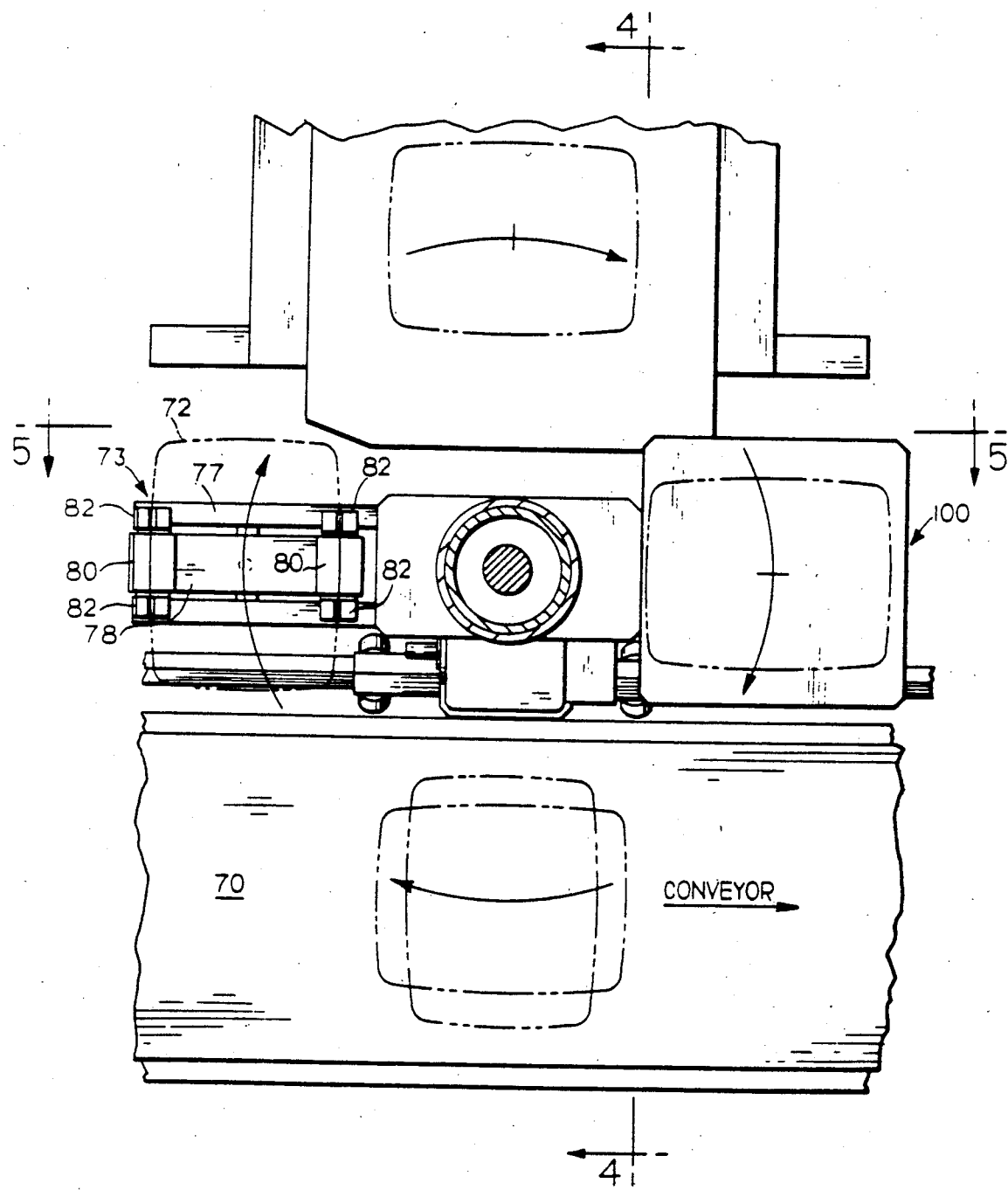
FIG. 3 is a schematic sectioned plan view taken at 3—3 of FIG. 2, showing on an enlarged scale one loader positioned along the conveyor at a loading station with the loader head removed to illustrate the stations of the loading machine.
Figure 5:
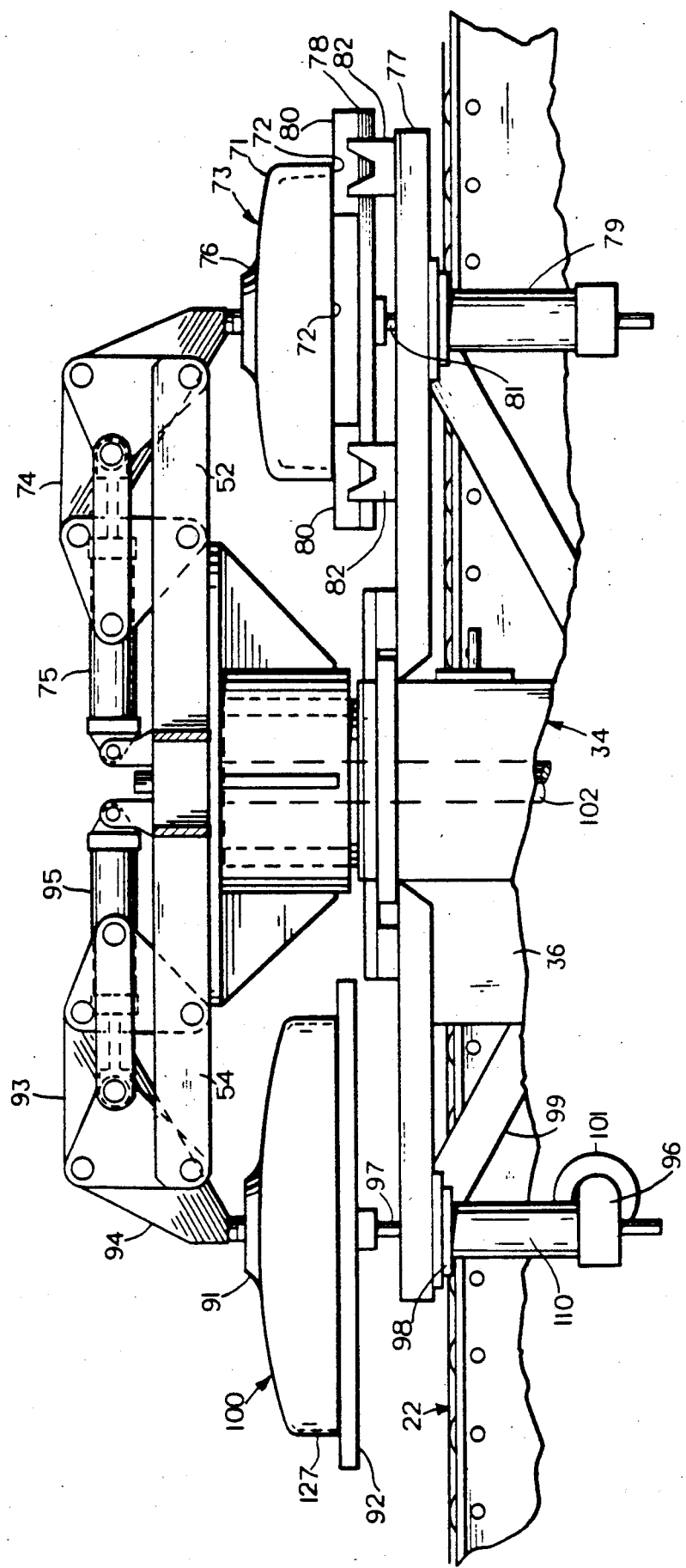
FIG. 5 is an enlarged partially sectional elevational fragmentary view of the loader of FIG. 4 taken from a position shifted 90° from FIG. 4 or from the position viewed along the lines 5—5 of FIG. 3 to illustrate the conveyor loading and grinder loading arms positioned above their carrier dwell positions in which a CRT faceplate panel can be oriented for loading into a grinder and reoriented for return to the conveyor.

Grinder loading arm 52, as shown in FIG. 5, has a home position along a line parallel to the longitudinal axis of the system, the conveyor and carriage advance direction, and above an orienting station 73 on the carriage. It has a four bar linkage mechanism 74 driven by a pneumatic cylinder 75 to move a vacuum cup 76 in the same manner and for the same CRT faceplate manipulating functions as is the case for arm 51. The orienting station 73 comprises a support shelf 77 extending from the carriage 34 along the longitudinal axial direction of the system between the conveyor and the aligned grinder machines. The support shelf 77 has an overlying support plate 78 which is vertically moveable relative to the shelf by means of pneumatically driven elevator cylinder 79 secured to the shelf. Cylinder 79 has a shaft 81 which will lower and raise the support plate according to a program to be discussed. Elastomeric pads 80 on the support plate engage the seal edge of a faceplate panel 71 to support it during a dwell and orient function. When the support plate 78 is lowered by cylinder 79, it carries portions of the CRT faceplate seal edge 72 into orienting blocks 82 which straddle the pads 80, as shown in FIG. 3, and the support plate 78 and pick up the seal edge to guide the faceplate by a camming action into a final oriented position for loading into the grinder machine 21. The delivery position of arm 52 is parallel to the grinder machine centerline.

Figure 4:
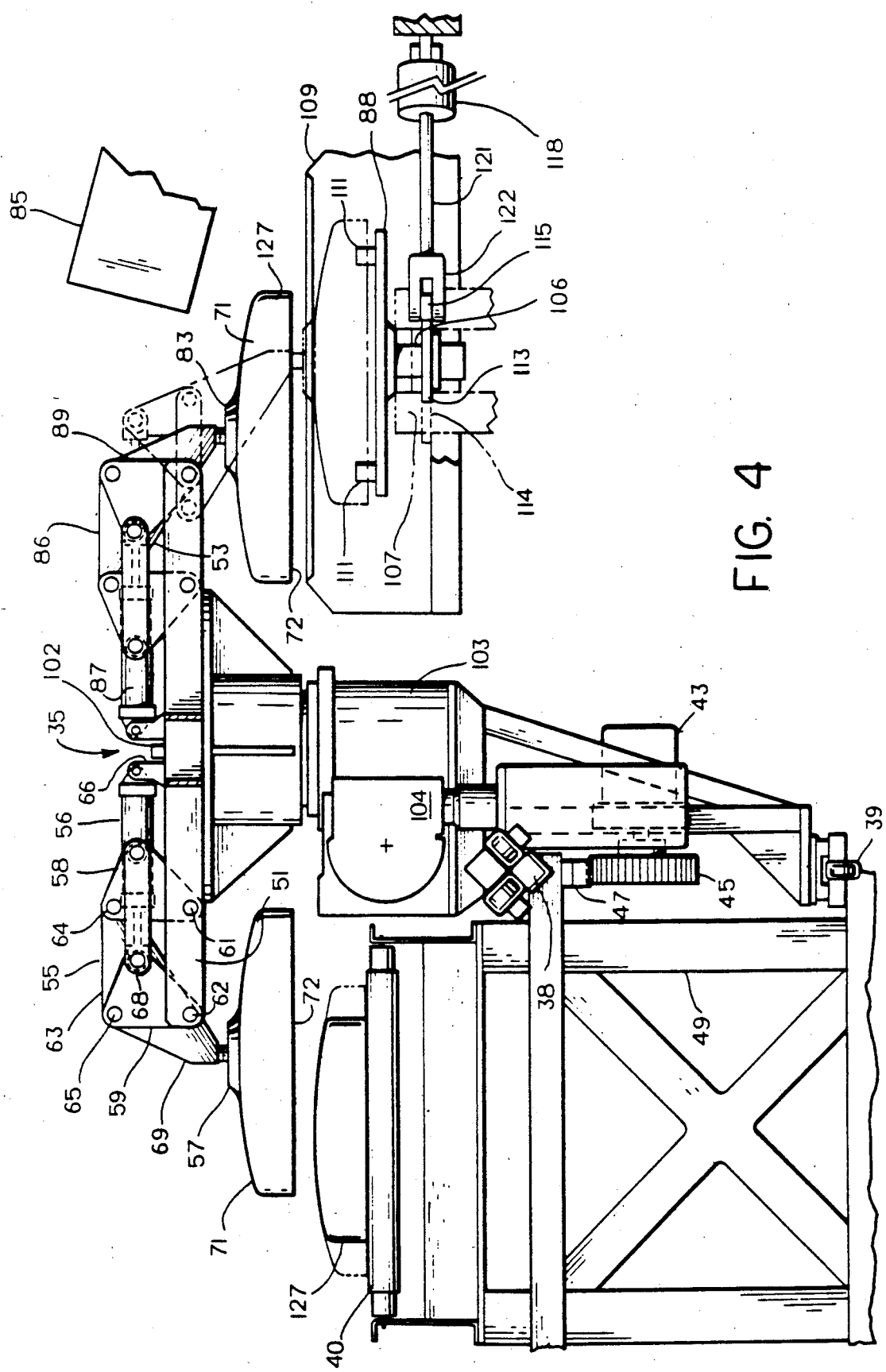
FIG. 4 is an enlarged partially sectioned elevational view of a loader with its conveyor and grinder unloading arms taken along the line 4—4 of FIG. 3 and its carriage, track and drive including a phantom view of the grinder unloading position in a grinder with the reorienting station, the conveyor loading arm and the mechanisms which it carries eliminated for illustrative purposes.

Grinder unloading arm 53, shown in FIGS. 2 and 4, carries a grinder machine unloading head which carries a vacuum cup 83. Its home position is along a line perpendicular to the longitudinal axis of the system and thus, when the carriage has brought the loader to a machine loading station, its axis is in the plane normal to the conveyor deck and containing the grinder machine centerline. Arm 53 is above the shroud 84 of the grinder machine 21 and clear of the hood 85. It has a four bar linkage mechanism 86 driven by a pneumatic cylinder 87 to move the vacuum cup 83 between a retracted and raised position in which it can support a CRT faceplate free of the grinder and an extended and depressed position in which it engages a ground faceplate on the grinder chuck 88. A vacuum head mounted bracket 89 is integral with the four bar linkage 86 and maintains the axis of the head and cup vertical while it is extended and retracted so that CRT faceplate engaged by the vacuum cup 83 is maintained with its seal edge in a generally horizontal plane. The delivery position of arm 53 is above a support table 92 between the aligned grinder machines and the conveyor, as best seen in FIG. 5.

A typical down and extended position of a vacuum cup is shown in phantom in FIG. 4 for grinder unloading arm 53. Each of arms 51, 52 and 54 have similar four bar linkages, pick up heads and vacuum cups which are moved to the down and extended position by selectively actuating pneumatic cylinders through solenoid controlled valves individual to the arms. Cylinders also drive the linkages and pick up heads to their up or retracted condition by solenoid valve controlled pneumatic driving force.

The conveyor loading arm 54, shown in FIG. 5, has mechanisms similar to arms 51, 52 and 53 for manipulating a vacuum cup 91 to pick up a CRT faceplate from a support table 92 on the carriage 36 and position it to be placed on conveyor 32 or 33. It has a four bar linkage 93 having an integral vacuum head mount bracket 94 which maintains the axis of the head and cup 91 perpendicular while it is advanced and lowered or retracted and raised by pneumatic cylinder 95. The delivery position of arm 54 is perpendicular to the longitudinal dimension of conveyor 22. The dwell station 100 to which CRT faceplates are delivered from the grinder machine 21 by grinder unloading arm 53 and from which faceplates are transferred to the conveyor by conveyor loading arm 54 is located between the aligned grinder machines 21 and the conveyor 22. The dwell station may include a reorienting mechanism to shift the faceplate ninety degrees around a central axis perpendicular to its face thereby identifying the faceplate as one which has been ground when it is placed on conveyor deck 40 with its major axis perpendicular to the conveying direction. Such a reorienting mechanism can be provided with the elements shown in FIG. 5 modified to rotate the support table 92 in 90° increments as a turntable, mounted on a rotatable shaft 97 supported in a journal 98 and driven by a selectively actuable drive 96 on a bracket 99 extending from carriage 36. A motor 101 is arranged to drive shaft 97 through a quarter turn so that faceplates placed on support table 92 are reoriented in quadrature to the position they were received from the grinder and will be in quadrature relative to unground faceplates when placed on the conveyor deck.

Arms 51, 52, 53 and 54 are driven clockwise, as viewed from above, through an arc of ninety degrees from their home stations by rotational motion of a vertical shaft 102 journalled on carriage 36. A Ferguson cam index 103 provides oscillating motion for shaft 102 to drive the shaft clockwise and simultaniously to carry the arms 51, 52, 53 and 54 to their delivery positions and then drive it counterclockwise to return the arms 51, 52, 53, 54 to their home positions. The cam 103 is driven with a variable speed motor 104 so that motion of the arms can be controlled as to acceleration and velocity.

Faceplates at the orient station 73 and the reorient or dwell station 100 are raised to engage the raised vacuum cups 76 and 91 by applying pneumatic pressure to their elevating cylinders 79 and 110 to move shafts 81 and 97 axially of their cylinders and upward. After a sufficient pause in the raised position to enable vacuum to be applied to cups 76 and 91, the support plate 78 and its support blocks are lowered to clear the seal edge 72 of the vacuum held faceplate panel in orient station 73 and the support table 92 is lowered to clear the seal edge 72 of the vacuum held panel in reorient or dwell station 100.

The vacuum cups 57, 76, 83 and 91 are caused to seize and support the CRT faceplate panels with which they are engaged by a vacuum imposed within their skirts. They also are arranged to release panels positively by application of positive air pressure within their skirts. A closed valve within each cup has an opening plunger extending into the skirted area so that the valve is open when the skirt is seated on a surface, such as a faceplate panel. A conduit (not shown) extends from a control valve (not shown) in communication with a source of vacuum and a source of positive air pressure. Selective control as by a solenoid control of the control valve applies either vacuum or positive pressure to the vacuum cup plunger valve. If the cup is engaged with a panel so that the plunger valve is open, vacuum, or positive pressure will be applied within the cup depending upon the control signal to the control valve.

With the loader at a station supplied a raw or unground panel by the conveyor and adjacent a grinder which has a ground panel on its mandrel, and with a raw panel in the orient station of the loader and a ground panel in the dwell or reorient station, the loader will advance panels at each of its positions. First, air is admitted to cylinders 56 and 87 to extend and lower cups 57 and 83 into engagement with a raw panel 71 on the conveyor and a ground panel 71 in the grinder. Vacuum is applied to the cups and the plunger actuated valves therein are open to seize and support the panels against the cups. The orient and reorient elevators are elevated by pneumatically actuating cylinders 79 and 110 to raise the panels at those stations into engagement with vacuum cups 76 and 91. Vacuum is applied to cups 76 and 91 to seize and support the panels. While vacuum is maintained on cups 57 and 83, the cylinders 56 and 87 are actuated so the linkages and panels are retracted and raised. With vacuum maintained on cups 76 and 91, the orient and reorient elevators are lowered through operation of cylinders 79 and 110. The loader shaft is rotated clockwise one quarter turn to index all arms 51, 52, 53 and 54 and their supported panels forward to the next loader quadrant. The raw panel from the orient station on arm 52 is extended and lowered to place the panel seal edge on the nest blocks on the grinder chuck and the ground panel from the reorient station on arm 55 is extended and lowered to place the seal edge on the conveyor by admitting air to cylinder 75 and 95. The orient and reorient elevators are raised to bring pads 80 into supporting engagement with the seal edge of the raw panel picked from the conveyor by cup 57 and the table 92 into engagement with the seal edge of the ground panel picked from the grinder by cup 83. Vacuum is released and positive pressure air is applied to each of the cups to free them from their respective panels. Linkages 74 and 93 with their cups 76 and 91 are raised and retacted. All cups are free and clear of ware and the loader arms are returned to their home position by counterclockwise rotation as a reverse index operation. Thus, each of the linkages on the arms extend and lower their cups when their arms are normal to the conveying direction and each maintain their arms retracted and raised when their arms are parallel to the conveying direction. In the orient and reorient stations, panel transfer is by motion of the seal edge support with respect to the seal edge of the panel through raising and lowering those supports by cylinders 79 and 110. Cylinders 55, 74, 86 and 93 driving their respective four bar linkages raise and lower the vacuum cups to transfer panels at the conveyor and grinder. Following a panel transfer at a station, the unloaded cups, their support brackets, manipulating linkages and drive piston rods are retracted to provide clearance permitting the loader to be positioned at the next grinder in its sequence for another loading and unloading cycle.

Each grinder 21 comprises a tray 105 mounted for horizontal reciprocation normal to the conveying direction (by means not shown) and supporting a horizontal chuck 88 mounted for rotation in the tray about a vertical axis on shaft 106. A drive motor and gear box 107 are carried by the tray carriage for rotation of the chuck 88 during grinding as performed by a rubber tired wheel (not shown) rotated above the carriage and within a hood 85. A slurry of abrasive is the grinding medium and it is contained by the hood 85 and shroud 84 mounted around the tray carriage. Chuck 88 has a flat surface on which elastomeric nest blocks 111 are positioned to engage the faceplate adjacent its corners and retain it for rotation with the chuck as the tray 105 and thus the chuck is fed into the grinding tire at a speed programmed in accordance with the degree of material removal desired at various portions of the faceplate engaged by the tire. Upon completion of grinding, the tire is raised, the tray is extended toward the conveyor 22 and the chuck is aligned with the major axis of the rectangular CRT faceplate parallel to the longitudinal axis of the conveyor. This locates the ground faceplate so that when picked up by the vacuum cup on grinder unloading arm 53 it will be properly oriented for the dwell or reorient station 100 and the following return to the conveyor. Also the chuck 88 and its nest blocks 111 are oriented to receive the unground faceplate from the orienting station 73.

Figure 6:
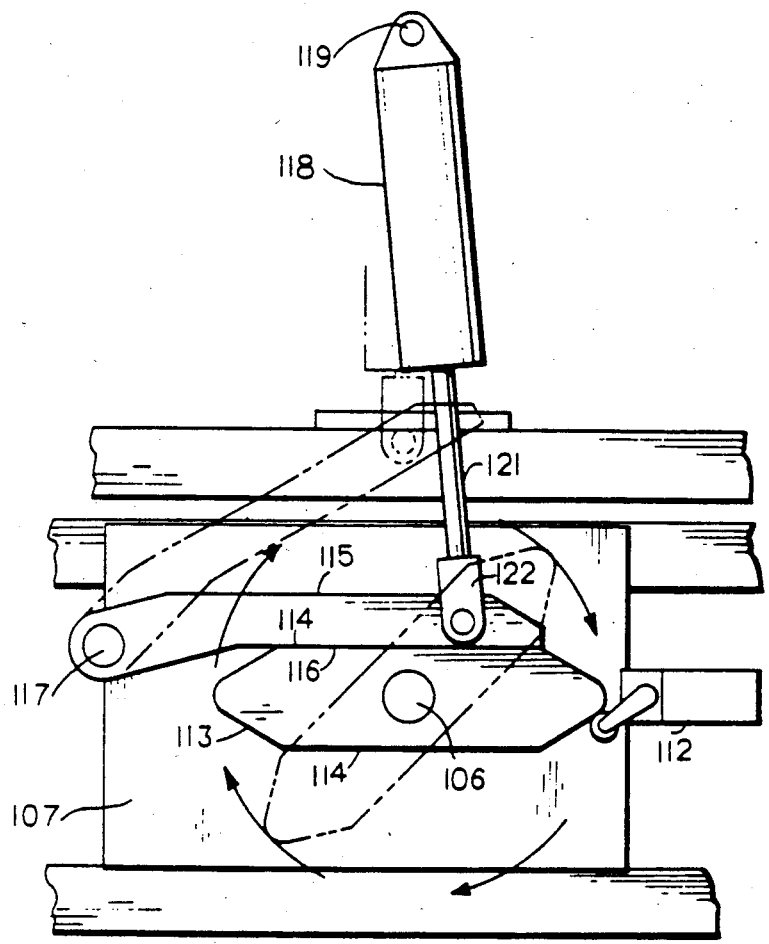
FIG. 6 is a plan view of the grinder chuck aligning mechanism arranged to insure rotational positioning of the grinder chuck to receive a CRT faceplate panel.

The drive for grinder chuck 88 is controlled to stop rotation with the chuck in its load-unload position, with the faceplate major axis parallel to the conveying direction. An interlock, FIG. 6, assures that this position has been achieved as by means of a switch 112 which enables the loader 34 or 35. If switch 112 is not actuated when the grinder motor 107 is stopped, the loader 34 or 35 is inhibited and a homing cam driver is actuated to drive the chuck 88 to its load-unload position. A cam 113 is keyed to chuck shaft 106 with flats 114 located to cooperate with a drive link 115 having a mating flat 116. Drive link 115 is pivoted on the tray carriage at 117 and is driven by a pneumatic cylinder 118 having its blind end pivoted on the carriage at 119 and its piston rod 121 coupled to link 115 at clevis 122. Thus, if switch 112 is not activated due to a misalignment of chuck 88, loader 34 or 35 is inhibited and cylinder 118 is supplied air to extend rod 121 driving link 115 toward shaft 106 and into engagement with cam 113. Flat 116 is driven against cam flat 114 causing cam 113 and shaft 106 to rotate into the load-unload position. This actuates switch 112 which causes the cylinder 118 to retract rod 121 and cam driver link 115 from cam 113 while also enabling unloader 34 or 35 so that the operation can proceed.

Conveyor 33 is driven by a motor and drive 123 mounted on conveyor support frame 49 and having controllable speed and distance of advance as by means of an a.c. motor driven by a variable frequency inverter through a reduction gear (not shown). Chain 124 couples conveyor 33 to conveyor 32 through clutch 125. When clutch 125 decouples the conveyors, conveyor 32 can be driven independently of conveyor 33 by a motor and drive 126 mounted upon conveyor support frame 49. Motor and drive 126 can also be controlled as to the speed and distance of advance of conveyor 32 by means of an a.c. motor driven by a variable frequency inverter through a reduction gear (not shown).

Figure 7:
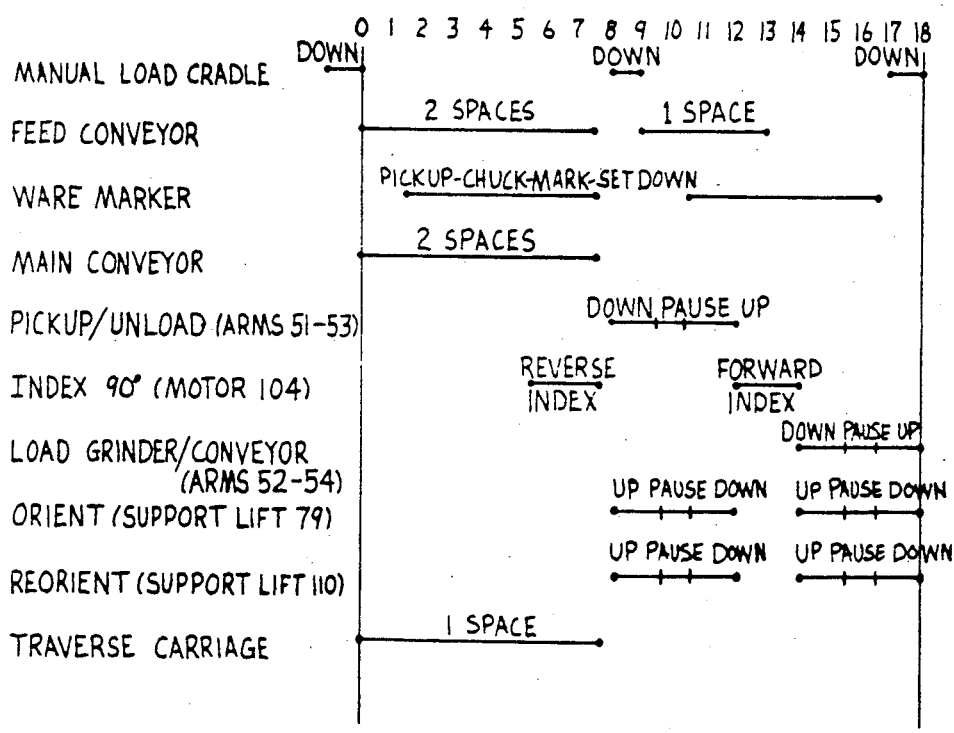
FIG. 7 is a timing chart for a conveyor and loader cycle.

The operation of the system will be recited with respect to the flow of a single CRT faceplate 71 with reference to FIG. 7. A faceplate 71 is manually loaded on cradle 23 with its major axis, if it is rectangular, generally parallel to the conveying direction and its seal edge 72 down. The loaded cradle pivots into cavity 27 between feed conveyor rollers 26 so that the faceplate seal edge 72 is supported upon those rollers. The drive for rollers 26 advance faceplate 71 to rollers 28 and into the marker-positioner station 29 where it is picked up on the fly and marked with its assigned grinder code, reoriented for further handling by the closure of jaws on the faceplate skirt 127 and returned to the conveyor rollers 28. It is then advanced on belt conveyor 31 one or two machine spacing increments to the centerline between the first or second pair of grinder machines, depending upon the sequence of its introduction, to be discussed.

Faceplate 71 is picked up by its loader 34 or 35 one machine position ahead of the grinder machine in which it is to be ground and after grinding it is reloaded on the conveyor one machine position following the grinder machine in which it was ground. When it reaches a position adjacent a loader, it is picked up and advanced to the orient station on the loader. The loader is then advanced one machine station. The faceplate is picked up from the loader orient station and loaded into the grinder placing its seal edge 72 on chuck 88 with its skirts 127 in nest blocks 111. The loader advances to the next machine and the grinder containing the faceplate proceeds with its grinder cycle.

When properly adjusted with respect to conveyor and loader timing, the system will return the loader to the machine grinding faceplate 71 as the grinding operation is concluded with the chuck properly aligned in the load-unload position and the grinder tray fully extended toward the conveyor. The loader cycle is performed and the unloading arm extends its vacuum head into the grinder machine to pickup faceplate 71, retract the vacuum head and faceplate, and index it to the dwell or reorient station. The loader then advances to the next machine station and rePeats its cycle so that the conveyor loading arm 54 picks up the faceplate from the dwell station on the loader and places it on the conveyor 22. It should be noted that the regular feeding of faceplates to the conveyor in the defined sequence assures that a vacant faceplate position is available to which the ground faceplate can be returned. That is, a raw faceplate is removed from the conveyor and a ground faceplate is placed in the position from which the raw faceplate was removed.

The main conveyor 33 then continues indexing in two machine station increments until it delivers the faceplate 71 to a continuously running takeout conveyor 30 which may be of the belt type driven by motor 128 and carries the faceplate to the next processing position.

The above sequence is performed in an integrated operation including the two loaders so that during normal operation the conveyor receives raw faceplates at regular intervals, faceplates which are unground and those which are ground are positioned on the conveyor. Each loader manipulates four faceplates simultaneously and transports two faceplates on its orient and dwell stations to the next machine. The loaders 34 and 35 are maintained with a separation of one half a grinder machine group, i.e. in the eight machine groupings having machines 1 through 8 in the righthand group served by loader 34 and machines 9 through 16 in the lefthand group served by machine 35. Loader 34 starts at station 1, its home station, while loader 35 stands by at station 9, its home station. Loader 34 picks up at station 1, advances to station 2 and deposits its faceplate in machine 2 while picking up a faceplate delivered by conveyors 32 and 33 at station 2. It then advances to 3 depositing the faceplate picked up at station 2 and picking up a raw faceplate from conveyor 33. Again it advances to station 4 depositing the faceplate picked up at station 3 and picking up a new faceplate. It then advances to station 5, the fifth of the eight stations and four stations from loader 35 at station 9. Both loaders 34 and 35 operate with this separation along the conveyor. Loader 34 picks up a raw faceplate at station 5 and loads the faceplate picked up at station 4 into machine 5 and loader 35 picks up a raw faceplate at station 9. Both loaders are advanced one station and the main conveyor advances two stations. Loader 34 picks up at station 6 and loads the station 5 pick up into machine 6 while loader 35 picks up at station 10 and loads the station 9 pick up into machine 10. This pattern of operation continues so that when loader 34 has picked up and loaded at station 8, loader 35 has picked up and loaded at station 12. Loader 34 then returns to its home station 1 where it picks up a faceplate from feed conveyor 32 and deposits the faceplate picked up at station 8 in the grinder machine at station 1.

At the next advance of loader 34 the faceplate picked up at station 1 is loaded into grinder 2 while the faceplate ground in grinder 2, during the time interval the loader served each machines 3 through, and returned to machine 2, is transferred to the dwell station of loader 34. Loader 34 advances to station 3 to load the unground faceplate picked up at 2 onto grinder 3 and to load the ground faceplate picked up from machine 2 onto conveyor 33.

When loader 34 is advanced from station 4 to 5, loader 35 is returned from station 16 to its home station 9. With the loading by loader 35 of the faceplate picked up at station 16 into machine 9 the system is fully loaded, all machines are functioning to grind faceplates and the loader cycles each involve the manipulation of four panels resulting in the removal of an unground faceplate from the conveyor and the placement of a ground faceplate on the conveyor in its stead.

Figure 9:
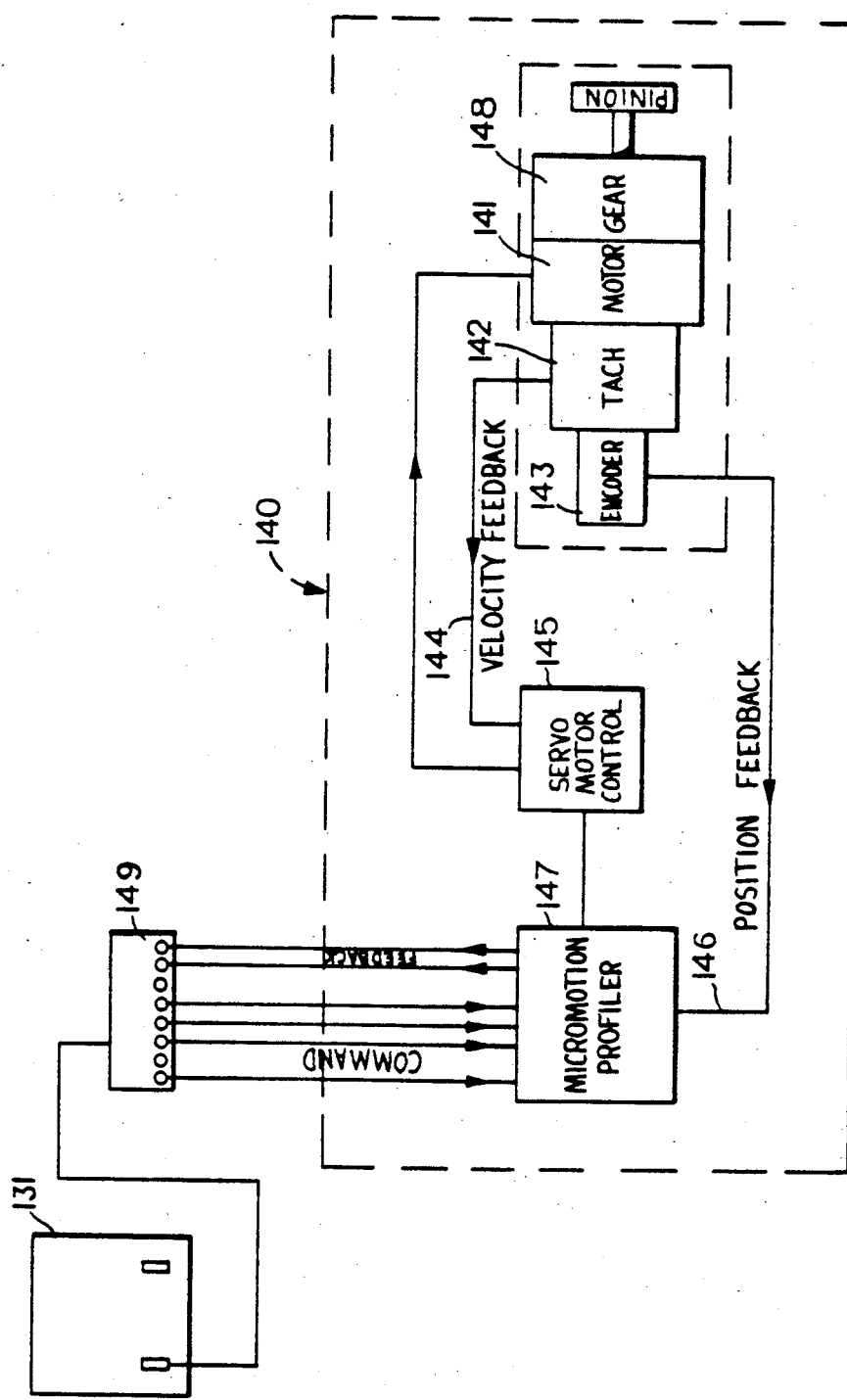
FIG. 9 is a block diagram of a typical motor the control system of which controls and coordinates the acceleration, velocity, position and timing of the motor driven conveyors and loader carriages to perform the functions represented in FIGS. 7 and 8A through 8E.
Figure 10:
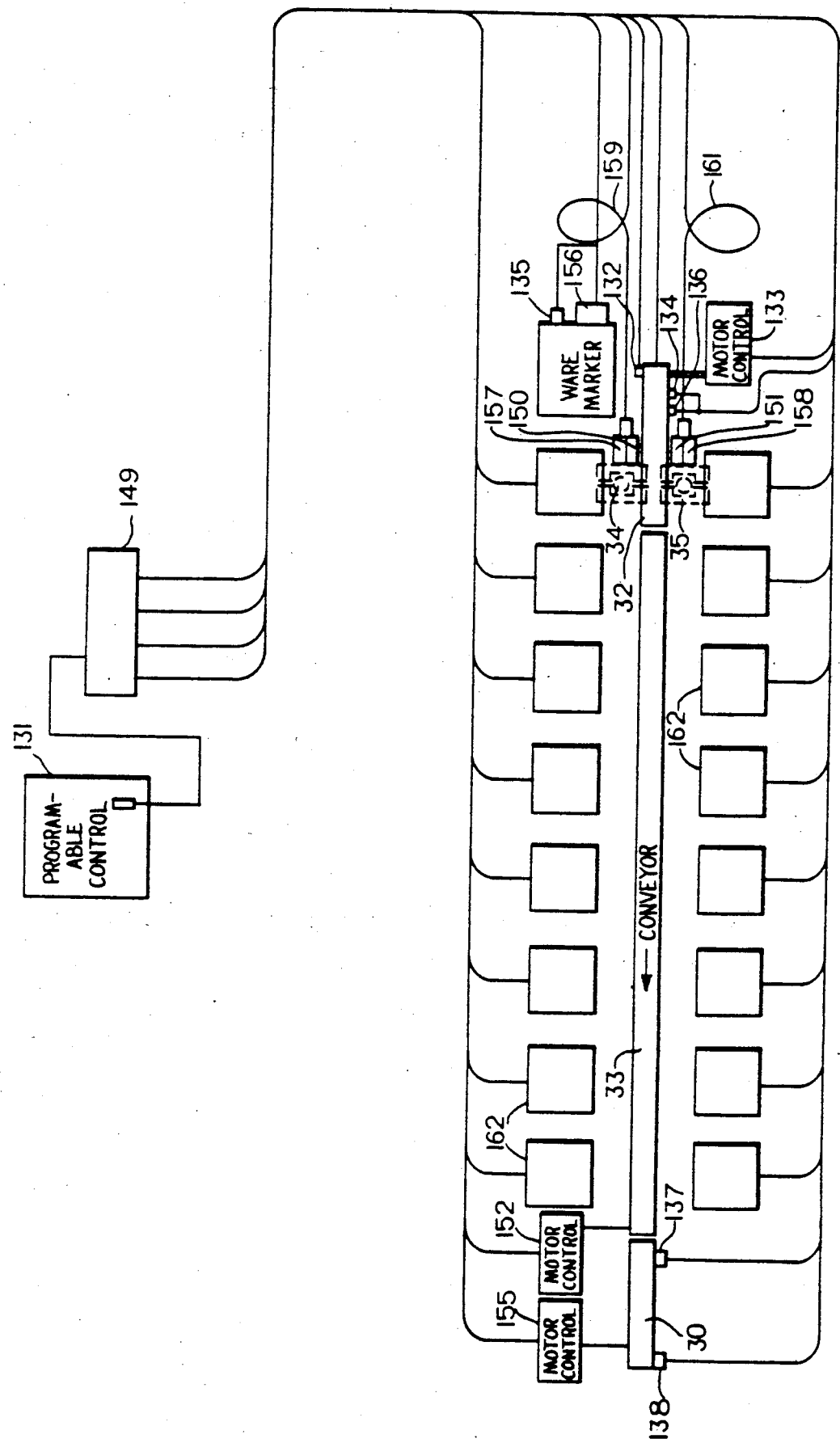
FIG. 10 is an overall block diagram of the sensing and control means for the system to illustrate their relationships to the programmable controller.

The apparatus is controlled by a programmable controller 131 as illustrated in block diagram form in FIGS. 9 and 10. The controller receives electrical signals as system inputs which indicate the state or position of the equipment and control changes in the state or position.

In one arrangement, ware is placed on the loading cradle 23 and a photosensor 132 detects the presence of the ware for the controller which enables loading when feed conveyor 32 signals, as from its motor control 133, that the conveyor is stopped. The load cradle pivots down to deposit the ware and the input conveyor 32 is started to advance the ware along rollers 26 to rollers 28. A ware sensor 134 detects the arrival of ware at the marker-positioner station and causes the ware lift in that station to pick up the ware for marking with the code of the grinder to which the ware is assigned for grinding. The marker is enabled only if the grinder is operating and has transmitted an operating signal to controller 131. Controller otherwise assigns the ware to the next available grinder in the system according to its assignment routine and causes the marker to apply the code for that grinder and the ware to be returned to the conveyor by the marker at the time appropriate for conveyance to the assigned grinder.

The ware marker-positioner 29 is the mechanism for establishing the spacing, location along the length, and orientation of the ware on the conveyors 32 and 33 as controlled by the controller 131 in causing the marker-positioner lift to return the ware to the conveyor rollers 28. Set down of ware is enabled only when the conveyor 31 is stopped and issues an enable signal through the controller. Once the lift has deposited the ware on the conveyor, indicated by station transducer 135 signal, and conveyor 31 has moved it out of the marker-positioner station as indicated by the ware clearance sensor 136, the marker-positioner station is enabled to pickup the next piece of ware.

The controller program establishes the interaction of the grinders and loaders. Grinders 21 issue signals as by switch 112 when they are ready to receive ware and when the loader has been positioned at the station for the ready grinder the controller causes the loader to load ware into the grinder. If a loader is moved in the program of its movements to a grinder which is out of service, the controller 131 will inhibit loading and the loader will not go through its loading motions. If the grinder is not ready for loading when the loader is present at its station, as where the grinder chuck 88 is not oriented to its load-unload position either because the grinding cycle has not been completed or the chuck was not stopped at the load-unload position, the loader will stand at the station and an indication of a non-operating condition issued. Orientation of the chuck 88 will enable the loader in the sequence described with reference to FIGS. 4 and 6.

Operation of the loaders is also controlled by controller 131. A local loop responsive to an enable and inhibit signal from controller 131 controls the loader carriage drives as will be described. Once a loader carriage is positioned at a loading station, the control of the pneumatic actuators for the motion of the heads on the loader arms, the control of the lifts at the orient and reorient stations and the control of vacuum or blow off air to the vacuum cups is by means of signals from the controller 131 to solenoid valves in the lines supplying pneumatic pressure, vacuum and blow off air.

The grinders 21 are controlled by individual controllers and are subject to controller 131 enable and inhibit signals as are the conveyors 30, 32 and 33. Conveyor 30 runs continuously when enabled. Conveyors 32 and 33 have local control loops for position acceleration and velocity of their drives.

At the discharge of the system, ware sensors 137 and 138 are provided to insure that ware does not stack up. Sensor 137 is at the input end of the takeout conveyor and 138 is at the discharge end. If ware is sensed at both sensors, the conveyors are stopped by controller 131.

FIG. 7 illustrates a timing cycle of the major functions of the system under fully loaded conditions, the cycle being measured from the completion of the cradle 23 loading of a faceplate 71 on rollers 26 through the second following completion of such loading. Immediately preceeding the cycle, ware on cradle 23 is lowered onto the conveyor as a "down" function of Manual Load Cradle. The main conveyor 33, which is coupled to the feed conveyor 32, advances two increments, that is two centerline to centerline spacings, thus causing the feed conveyor to advance two increments between time 0 and 7.5 at Feed Conveyor. This carries the loaded ware into the ware marker station 29 where it is picked up on the fly while a previously advanced piece of ware at position 1-9 is advanced two stations to position 3-11 and all other ware distributed along main conveyor 33 is advanced two stations. In the ware marker 29, the newly picked up piece of ware is lifted then chucked to proper alignment for placement in the conveyor, marked and as the feed conveyor stops set down on the feed conveyor.

Assume loader 34 and its carriage 36 were at station 2, centered on position 2-10 of FIG. 1, and had a raw panel on its orientor which it picked up from the conveyor at station 2, and a finished pane 1 on its dwell or reorientor which it picked up from grinder 2. Also assume that the loader arms 51, 52, 53 and 54 of loader 34 are in their forward index position with arm 51 in the orienting station 73, its arm 52 perpendicular to the conveying direction, its arm 53 in the dwell or reorient station 100 and its arm 54 over the conveyor 33. All vacuum cupheads are retracted. The carriage 3 is traversed in the interval 0 to 7.5 at Traverse Carriage function to advance the carriage one space increment from station 2 to station 3. During this traverse the arms are reverse indexed 90° to position arm 51 over conveyor 33, arm 52 in orient station 73, arm 53 perpendicular to the conveyor and arm 54 in the dwell reorient station 100 as signified in Index 90° function as a reverse index. With carriage 36 stopped, the loader is enabled if the grinder 3 chuck 88 is in its load-unload position and conveyor is not moving.

As indicated at the pickup/Unload function of FIG. 7 between the 8 and 12 time increment limits the vacuum heads on arms 51 and 53 are actuated by pneumatic drive of cylinders 56 and 87 to engage vacuum cup 57 with the raw panel 72 advanced to station 3 and to engage vacuum cup 90 with the ground panel chuck 88 in grinder 3. The orient lift cylinder 79, 79 and reorient lift cylinder 95 receive pneumatic drive to raise support plate 78 and its raw panel from the orienting blocks 82 into engagement with vacuum cup 76 and to raise table 92 and its ground panel from grinder 2 into engagement with vacuum cup 91. Vacuum is applied to all cups and the engaged panels are seized by their vacuum cups during the "down-pause" portion of the pickup-Unload function and the "up-pause" portion of the Orient and Reorient functions occurring in time interval 8 to 10.5. In the balance of the interval for those functions from time interval 10.5 to 12 the vacuum heads on arms 51 and 53 are raised to lift the panels from the conveyor 33 and grinder 3 and the orient and reorient lifts are depressed to free the panels supported by the vacuum heads of arms 52 and 54.

With all arms supporting suspended panels, the loader 34 is rotated 90° clockwise as indicated at function Index 90° by "forward index" interval at time 12 to 14. The arms then release their panels at the advance stations. The raw panel from orientor blocks 82 is deposited on grinder 3 chuck nest blocks 111 and the ground panel from dwell or reorient station 100 is deposited on conveyor 33 by extending and lowering vacuum heads on arms 52 and 54 through pneumatic drive control of cylinders 75 and 93 as indicated at function Load Grinder/Conveyor at time intervals 14 to 16.5 designated "down pause". During this interval, the raw panel in the orient station is engaged by plate pads 80 and the ground panel from machine 3 is engaged by support table 92 through pneumatic drives to cylinders 79 and 110 as at functions orient and Reorient "up pause" intervals. The vacuum is relieved in vacuum cups 57, 76, 90, 91 and blow off air is imposed in those cups to release the panels during this "up pause" interval. The vacuum heads on arms 52 and 54 are raised and retracted through pneumatic drive control of cylinders 75 and 93 as indicated at function Load Grinder/Conveyor interval "up" between times 16.5 and 18. The panels are lowered from vacuum cups 57 and 90 on arms 51 an 53 by pneumatic drives to cylinders 79 and 110 at functions Orient and Reorient in intervals "down" of time periods from 16.5 to 18. The loader head is free of all panels at this moment and is clear of the conveyor and grinder 3 so that its carriage can advance in the next cycle which is a repetition of that outlined above and depicted in FIG. 7.

In operating as a system shown in FIG. 1 the cycles of operation are as shown in FIGS. 8A through 8E. In those cycles, as illustrated, each panel is identified by distinctive cross hatching of the intervals of operating functions effective upon that panel. Those functions, which operate upon no panel are shown as lines in the manner illustrated in FIG. 7. Notations of the conveyor transport of panels are included as are advanced of the carriage 36 of loader 34 and 37 of loader 35, the loading of the grinders by number, and the transfer of finished panels to the conveyor are presented as notes on the drawings.

As shown in FIGS. 8A through 8E, the panels are assigned for grinders in the order as depicted from left to right at function Manual Load Cradle: 2, 3, 4, 5, 6, 7, 8, 1, 10, 11, 12, 13, 14, 15, 16, 9 and repetitively thereafter (shown as primed numbers) so long as all grinders are operative. The grinders and panel are all of the same type, hence, grinder cycle intervals for a given panel type should be identical in length. The system is arranged so that the panel loading cycle for all grinders is completed as or before the grinder cycle so that the loader system should be the limiting factor in an ideal arrangement. In any event, a grinder must complete its cycle even if the loader system is required to wait to unload the grinder.

A typical operation on the first panel, the panel assigned grinder 2 is illustrated by the solid time function bars. Thus, panel 2 is loaded by the cradle preceeding the first cycle it is fed to marker by feed conveyor driven by main conveyor, marked and after the feed conveyor is stopped, placed on feed conveyor all in the first portion of the first cycle. In a second portion of the first cycle, it is fed to station 1 by the feed conveyor as indicated by the legend "TO 1", it is picked up by loader 34 at station 1 which is forward indexed to the orienter. Following the feed conveyor advance driven by the main conveyor, the second panel is loaded as panel 3 designated as a bar which is neither crosshatched nor shaded. Panel 3 is fed to the ware marker in the first cycle of the system and returned by the marker to the feed conveyor.

In the second system cycle a normal cycle as described for FIG. 7 is performed since the loader has advanced to station 2 and need not be concerned with the motion of the feed conveyor and its possible disruption of the pick Up/Unload function. Panel 2 is transported to station 2 on the orienter of loader 34 and in the second half of the second cycle is unloaded into grinder 2 as a transfer from the orient station 73 to the grinder through a pickup function, a 90° advance index and a load function. Panel 3 is advanced from the marker to station 2 of the conveyor by traversing feed conveyor 32 and into main conveyor 33. Panel 3 is picked up and placed in orient station 73. Panel 4 is fed by feed conveyor to the marker. Panel 5 is loaded on the stopped feed conveyor in the first portion of the second system cycle.

In the terminal portion of the second system cycle panel 3 is picked up indexed and placed in the orient station 73. The feed conveyor advances one space increment to move panel 4 to station 4. Panel 5 is advanced to the marker and marked and panel 6 is loaded on the stopped feed conveyor.

The third cycle involves manipulation of panels 3, 4, 5, 6, 7 and 8. Panel 3 is carried by loader 34 to station 3 and loaded in grinder 3. Panel 4 is advanced to station 3 by feed and main conveyors is picked up by loader 34 and is placed in orientor 73. Panel 5 is advanced to station 2 by feed and main conveyors. Panel 6 is advanced to the marker, marked and advanced to station 1. Panel 7 is loaded on feed conveyor, advanced to marker, and marked. Panel 8 is loaded on the feed conveyor.

Figure 8A:
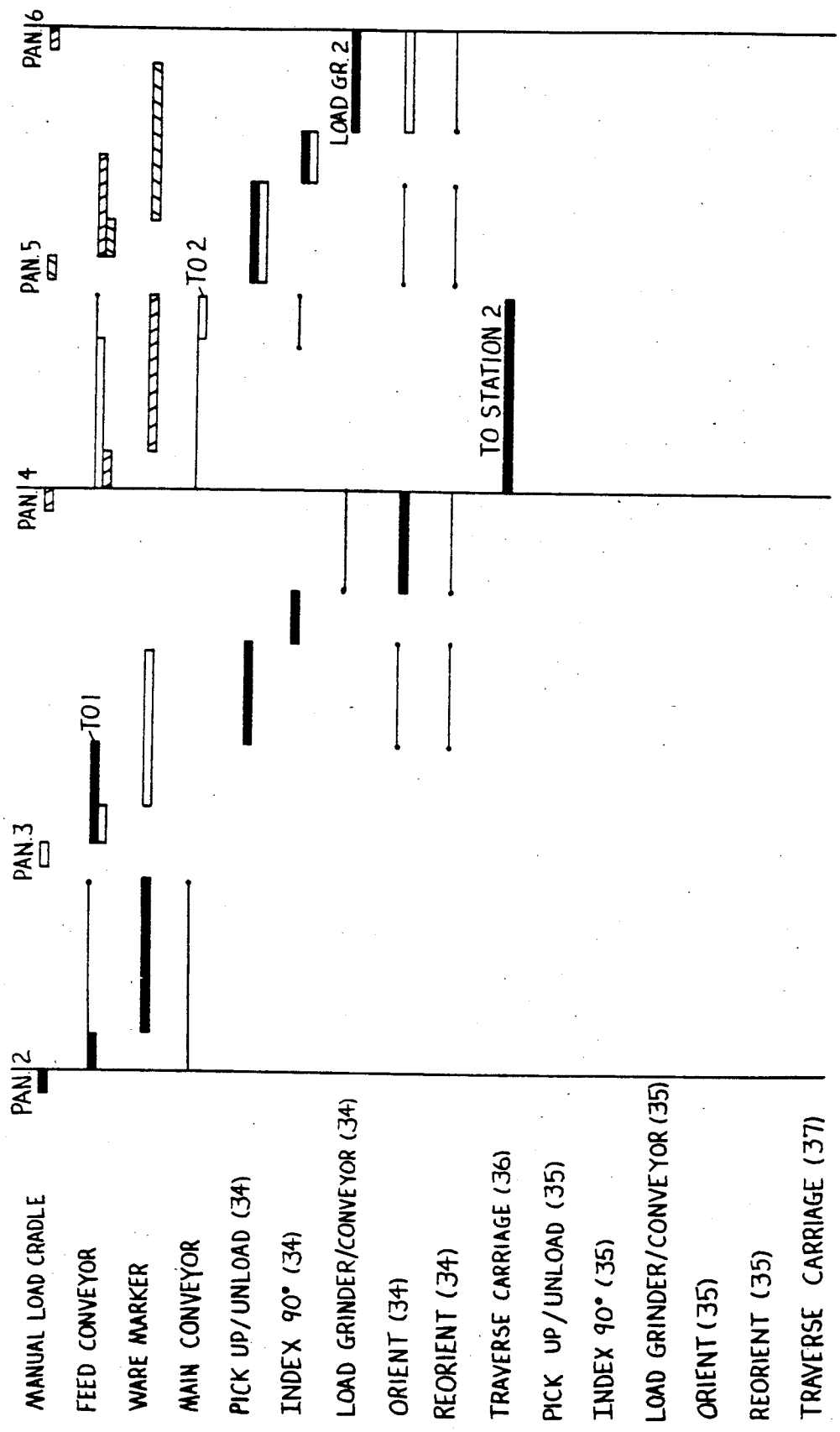
FIG. 8A through 8E is a timing chart the sheets of which when placed in horizontal alignment along their length dimension shows the progress of panels through the apparatus from conveyor loading through distribution to loading stations to pickup by the loaders, loading into the grinder to which they were assigned and, after a grinding interval, unloading from the grinder and return to the conveyor.
Figure 8B:
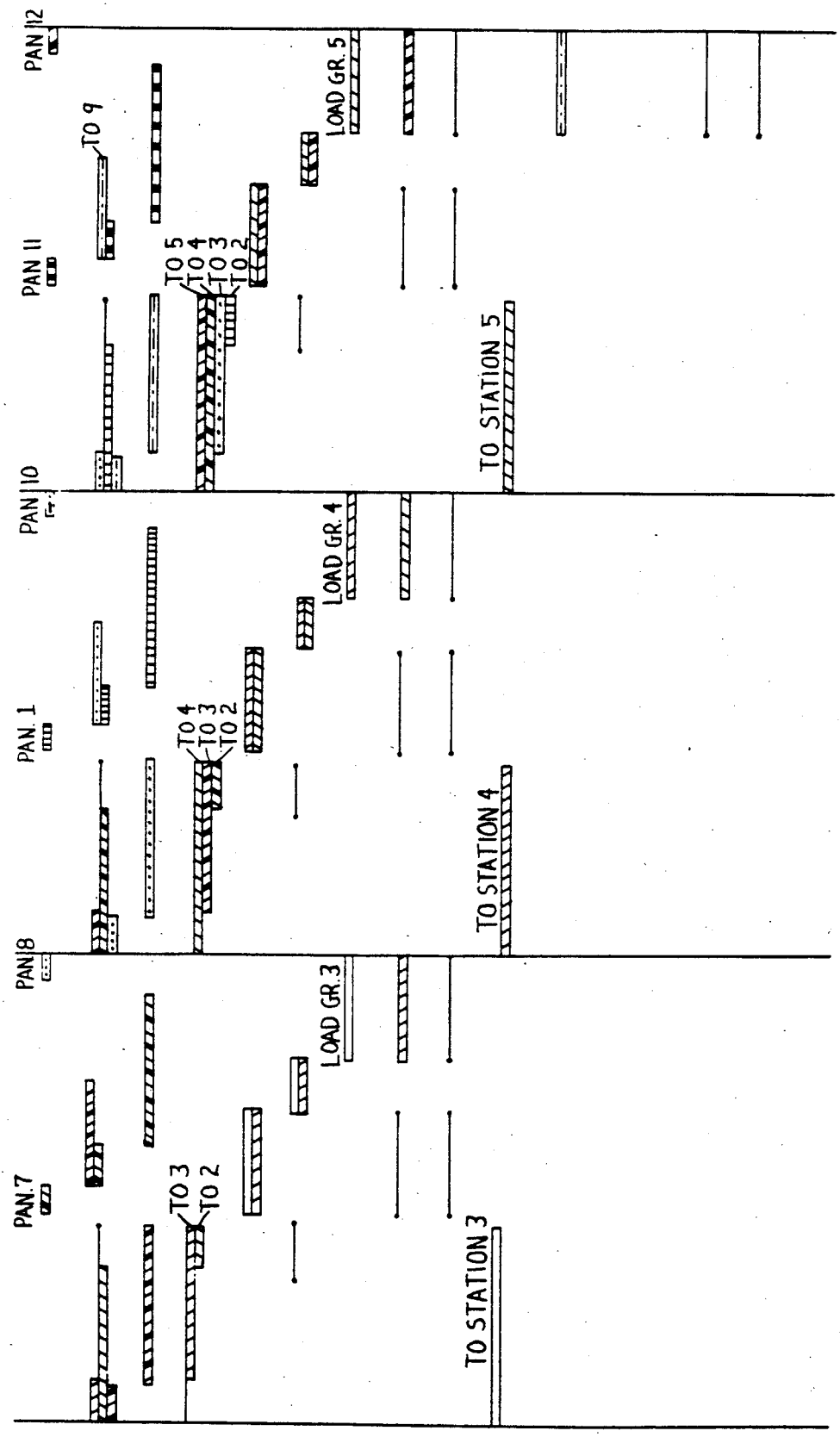

In the fourth cycle, as shown in FIG. 8B, the handling of panels for both groups of grinders is begun with the loading of panel 10. Panels 4, 5, 6, 7, 8, 1 and 10 are handled in this cycle. Panel 4 is advanced with loader 34 to station 4, picked up from the orientor and loaded into grinder 4. Panel 5 is advanced to station 4, is picked up by loader 34 and transferred to orientor 73. Panel 6 is advanced to station 3 by main conveyor. Panel 7 is advanced to station 2 by feed and main conveyor. Panel 8 is advanced to the marker, marked, oriented and placed on feed conveyor and advanced to station 1. Panel 1 is loaded, advanced to the marker, marked, oriented and placed on the feed conveyor. Panel 10 is loaded.

In the fifth cycle, as shown in FIG. 8B, panels 5, 6, 7, 8, 1, 10, 11 and 12 are handled and loader 35 comes into operation at station 9 in position 1-9. Panel 5 is advanced with loader 34 to station 5, picked up from the orientor and loaded into grinder 5. Panel 6 is advanced to station 5, is picked up by loader 34 and transferred to orientor 73. Panel 7 is advanced to station 4 by the main conveyor. Panel 8 is advanced to station 3 by the feed and main conveyor. Panel 1 is advanced to station 2 by the feed and main conveyor. Panel 10 is advanced to the marker, picked up, oriented, marked and returned to the feed conveyor and advanced to station 1 from which it is picked up by loader 35 after the feed conveyor has stopped. Panel 11 is loaded, advanced to the marker, picked up, oriented, marked and set down on the feed conveyor. Panel 12 is loaded.

Figure 8C:
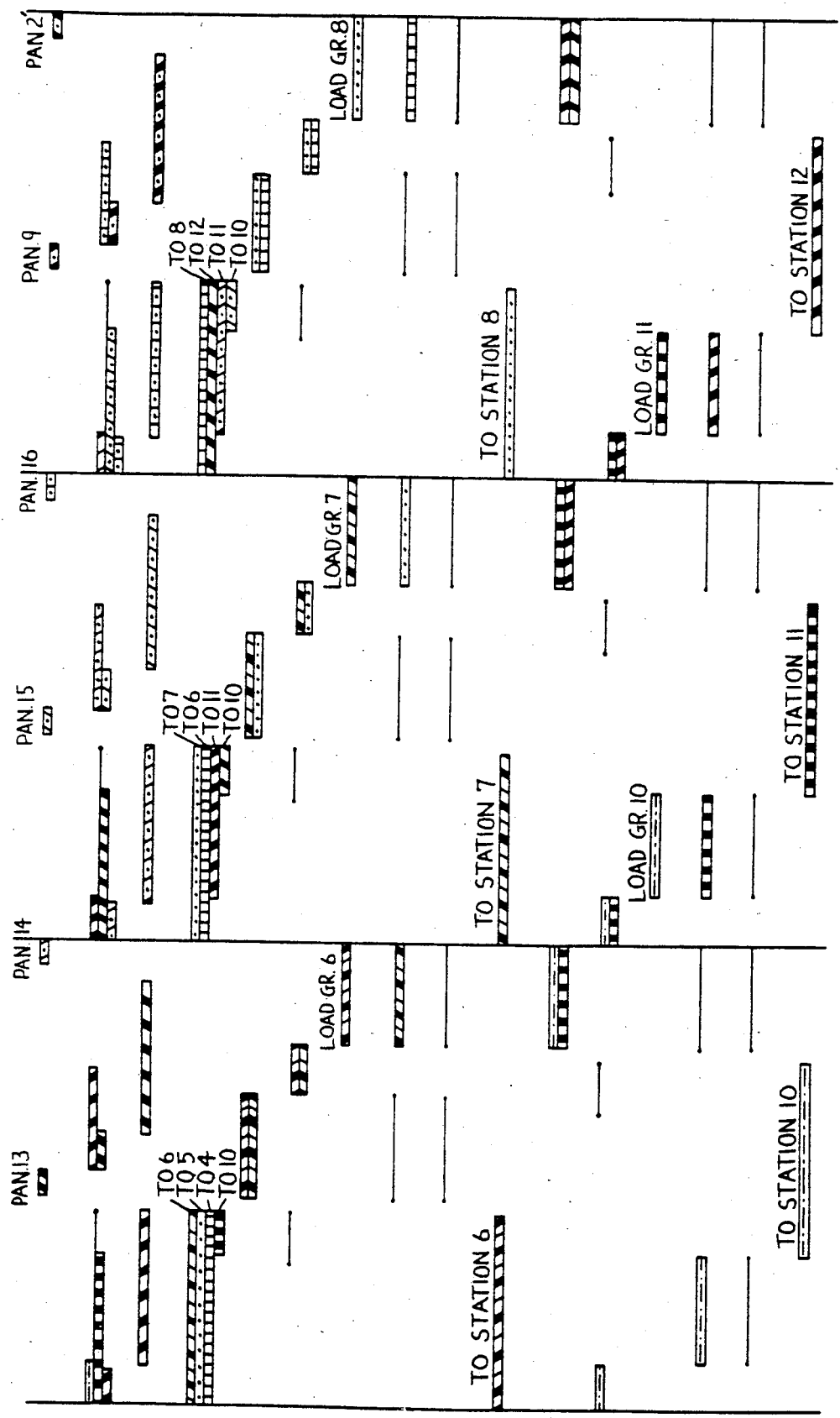

In the sixth system cycle, as shown in FIG. 8C, panels 6, 7, 8, 1, 10, 11, 12, 13 and 14 are handled, carriage 37 makes its initial traverse from station 9 to station 10 and both loaders 34 and 35 are fully operative. Panel 6 is advanced with loader 34 to station 6, picked up from the orientor and loaded into grinder 6. Panel 7 is advanced to station 6, picked up and placed in the orientor of loader 34. Panel 8 is advanced to station 5. Panel 1 is advanced to station 4. Panel 10 is advanced with loader 35 to station 10 and picked up from the orientor of loader 35. Panel 11 is advanced to station 10 by the feed and main conveyor and is picked up by loader 35. Panel 12 is advanced to the marker, picked up, oriented, marked, returned to the feed conveyor and advanced to station 9. Panel 13 is loaded, advanced to the marker, picked up, oriented, marked, and returned to the feed conveyor after it stops. Panel 14 is loaded.

In the seventh system cycle, as shown in FIG. 8C, four raw panels are advanced on the main conveyor. Panels 7, 8, 1, 10, 11, 12, 13, 14, 15 and 16 are handled. Panel 7 is advanced with loader 34 to station 7, picked up from the orientor of loader 34 and loaded into grinder 7. Panel 8 is advanced to station 7, picked up and placed in the orientor of loader 34. Panel 1 is advanced to station 6. Panel 10 is loaded into grinder 10. Panel 11 is placed in the orientor of loader 35, advanced with loader 35 to station 11, and picked up from the orientor of loader 35. Panel 12 is advanced to station 11 and picked up by loader 35. Panel 13 is advanced to station 11 by the feed and main conveyor. Panel 14 is advanced to the marker, picked up, oriented, marked, returned to the stationary feed conveyor, then advanced to station 9 by the feed conveyor. Panel 15 is loaded, advanced to the marker, picked up, oriented, marked and returned to the feed conveyor. Panel 16 is loaded.

In the eighth cycle, as shown in FIG. 8C, functions corresponding to those of the seventh cycle are performed with panels 7 and 10 dropped out and panels 9 and 2' added. Panel 2' is the first of a second cycle of panels and will be ground in grinder 2. Loader 34 loads grinder 8 which is at the end of it traverse and loader 35 advances to station 12.

Figure 8D:
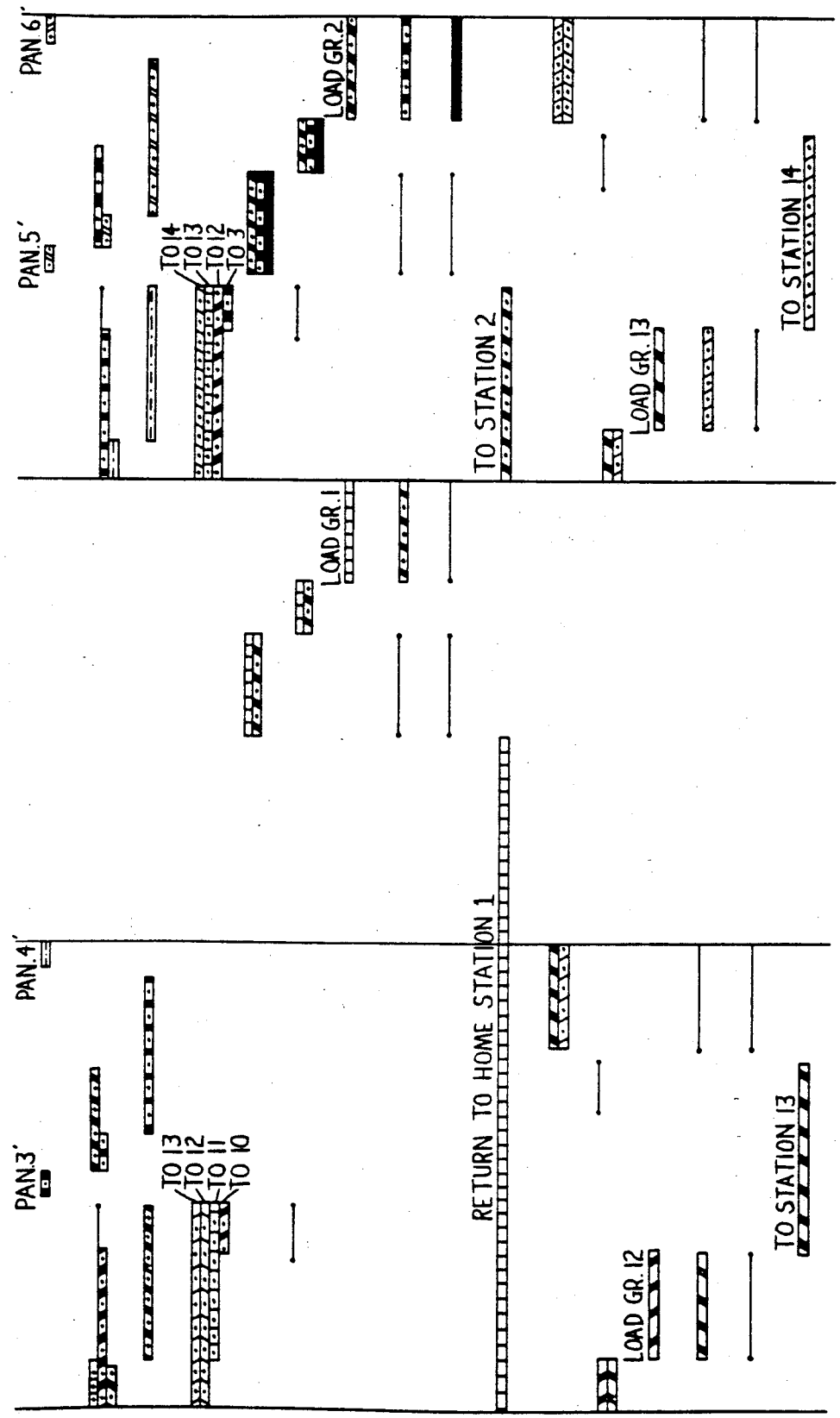

In the ninth cycle, shown in FIG. 8D, loader 34 initiates a return traverse to its home position at station 1. The time consumed in that return exceeds a normal system cycle and since timing relationships are maintained with respect to loader position and the transport of panels by the feed and loader conveyors, some alteration of the routine occurs. panels 1, 12, 13, 14, 15, 16, 9, 2', 3', 4' are handled. Panel 1 is carried toward station 1 by the loader as it returns. Panel 12 is loaded into grinder 12 by loader 35. Panel 13 is advanced to station 13 in the orientor of loader 35 and picked up. Panel 14 is advanced to station 13 on conveyor 33 and picked up by loader 35. Panel 15 is advanced to station 13 on conveyor 33 and 16 is advanced to station 11 on feed conveyor 32 and main conveyor 33. Panel 9 is advanced by feed and main conveyor to station 10. Panel 2' is advanced to station 1 by the feed conveyor. Panel 3' is loaded, advanced to the marker, picked up, oriented, marked and returned to the conveyor. Panel 4' is loaded.

A delay is introduced in conveyor indexing, as shown in FIG. 8D, for an interval sufficient to permit loader 34 to complete its return traverse to station 1 and load panel 1 in grinder 1 while picking up panel 2' from the feed conveyor at station 1.

Regular cycling of the system resumes, as shown in FIG. 8D, in the tenth cycle in which panels 13, 14, 15, 16 and 9 of the initial cycle, and 2', 3', 4', 5' and 6' of the second system cycle are handled. Panel 13 is loaded into grinder 13 by loader 35. Panel 14 is placed in the orientor of loader 35 advanced to station 14, and picked up in the orientor of loader 35. Panel 15 is advanced to station 14 on conveyor 33 and is picked up by the loader 35. Panel 16 is advanced to station 13 on conveyor 33. Panel 9 is advanced to station 13 by conveyor 33. Panel 2' is advanced to station 2 by loader 34 and loaded into grinder 2 after panel 2 of the first system cycle has been removed from grinder 2 and placed in reorient or dwell station 100 of loader 34. At this time, and for following regular cycles, loader 34 will manipulate a panel at each of its four vacuum heads. Panel 3' is advanced by conveyors 32 and 33 to station 2, is picked up by loader 34 and placed in its orientor. Panel 4' is advanced to marker 29 by conveyor 32, picked up, oriented, marked, returned to the stationary conveyor 32 and advanced to station 1 by conveyor 32. Panel 5' is loaded, advanced to marker 29 by conveyor 32, picked up, oriented, marked, and returned to the stationary conveyor 32. Panel 6' is loaded.

Figure 8E:
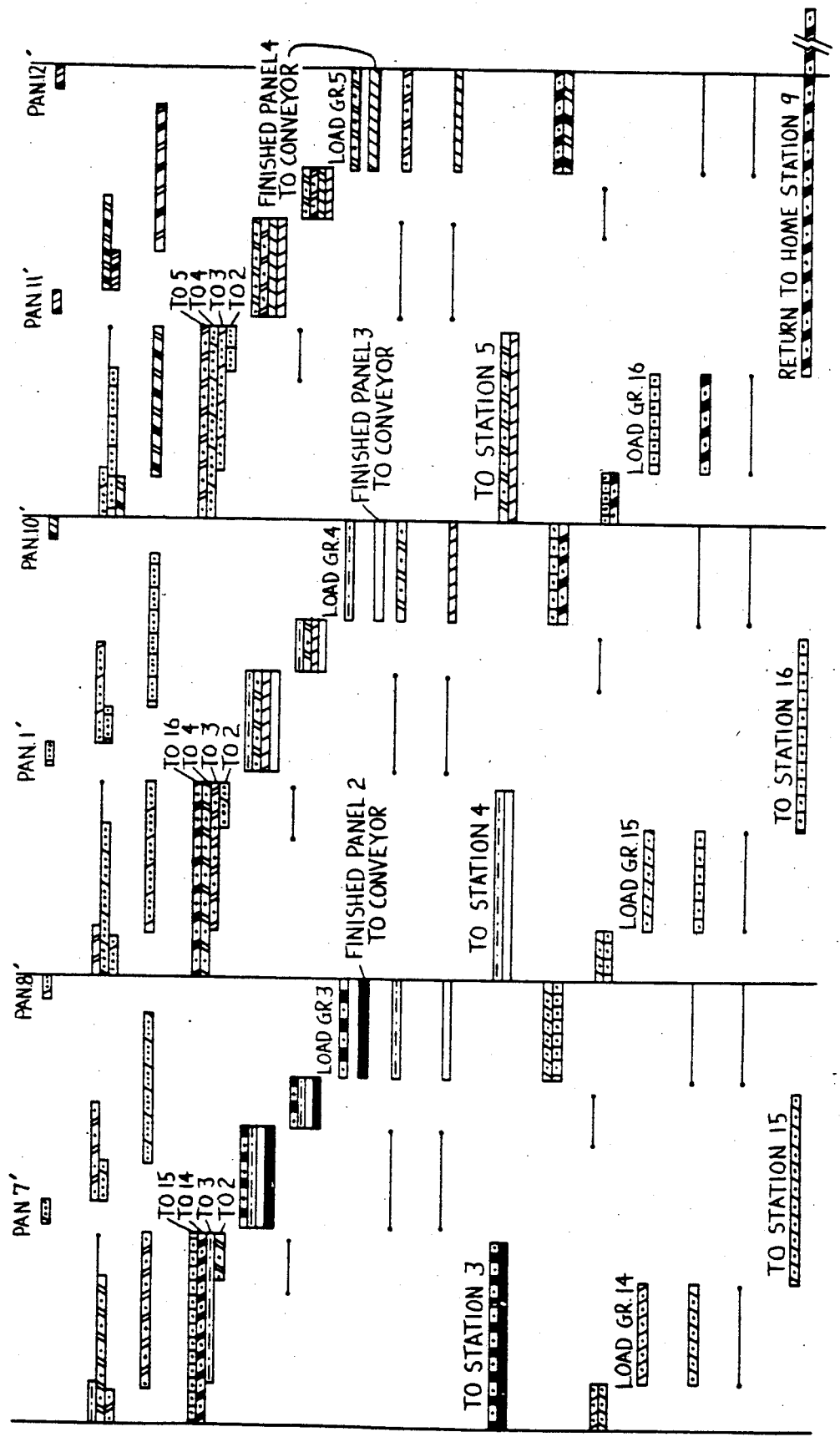

The eleventh cycle, shown in FIG. 8E, returns the first ground panel to the conveyor, panel 2, and transports to the next station the first of a raw panel, panel 3', and a ground panel, panel 2, on the loader 34. In this cycle, panels 14, 15, 16, 9, 2, 3, 3', 4', 5', 6', 7' and 8' are handled. Panel 14 is loaded into grinder 14 by loader 35. Panel 15 is placed in the orientor of loader 35, advanced with the loader to station 15 and picked up from the orientor. Panel 16 is advanced to station 15 on conveyor 33 and is picked up by loader 35. Panel 9 is advanced to station 14 by conveyor 33. Ground panel 2 is advanced to station 3 in loader 34 reorient dwell station and transferred to the conveyor in the location from which panel 4' was removed by loader 34. Ground panel 3 is removed from grinder 3 and placed in reorient dwell station 100 of loader 34. Raw panel 3' is removed from orientor and loaded into grinder 3. Panel 4' is removed from conveyor 33 and placed in orienting station 73 of loader 34. Panel 5' is advanced by conveyor 33 to station 4. Panel 6' is advanced by conveyor 32 to marker 29, picked up, oriented, marked, returned to conveyor 32 and advanced to station 1 by conveyor 32. Panel 7' is loaded, advanced by conveyor 32 to marker 29 picked up, oriented, marked and returned to conveyor 32. Panel 8' is loaded.

System cycle twelve is similar to cycle eleven, as shown in FIG. 8E. Ground panel 3 is returned to the conveyor at station 4 from which panel 5' was removed, grinder 4 has ground panel 4 unloaded and panel 4' loaded and grinder 15 is loaded by loader 35 with panel 15.

System cycle thirteen, as shown in FIG. 8E, returns loader 35 to its home station, station 9, carrying panel 9. Ground panel 4 is returned to conveyor 33 by loader 34 in the position from which raw panel 6' was removed. Loader 34 unloads ground panel 5 from grinder 5 and loads raw panel 5' into grinder 5.

In the fourteenth cycle (not shown) loader 35 has returned to its home station and loads panel 9 into grinder 9 while picking up panel 10' from feed conveyor 32 at station 9. Thus, a second cycle of the panels assigned the left bank of grinders 21 begins while the loader 34 continues its unloading, orienting, loading, reorienting, and reloading functions at each of grinder 6, 7, 8, 1, 2, 3, 4 and 5.

In the fifteenth cycle (not shown) loader 35 begins to handle three panels simultaneously. At station 10, it picks up panel 11' from conveyor 33 and places it on its orient station; advances panel 10' from its orient station to grinder 10, removes ground panel 10 from grinder 10 and places it in the reorientor or dwell station 100. Loader 34 continues its handling of four panels at station 6.

In the sixteenth cycle, and thereafter, (not shown) both loaders 34 and 35 are handling four panels simultaneously. Loader 35 at station 11 returns ground panel 10 to conveyor 33, loads raw panel 11' in machine 11, picks raw panel 12' from conveyor 33, and unloads ground panel 11 from machine 11.

With all grinders functioning and panels loaded at regular intervals, the system as illustrated loads 16 raw panels per system cycle and off loads 16 ground panels continuously. If a grinder is out of operation, the controller 131 prevents the placement of a panel assigned that grinder on feed conveyor 32 and inhibits the coding of that grinder on a panel at marker 29 The loader servicing the non-operating grinder advances to the grinder station but does not perform any grinder loading or unloading functions.

In shutting down the system, the feed of raw panels is terminated and the loaders continue to run until they have unloaded the last panel from their dwell reorient stations. They would then return to their home stations and conveyors would continue to run until all panels had been off loaded at output conveyor 30.

The indexing motion of the conveyors 32 and 33 and the loader carriages 36 and 37 is controlled with respect to acceleration, velocity and position or displacement and position and motion is indicated and commanded by the controller 131. Each of conveyors 32 and 33 have drives which have local control loops which can comprise a position feedback loop and velocity feed back loop as typified in FIG. 9 by the motor control system 140. System 140 has a motor 141 having a tachometer 142 and a displacement encoder 143 driven by the motor shaft. The velocity feedback loop 144 comprises the tachometer 142, a servomotor control 145 and the motor 141. The displacement and position feedback loop 146 includes encoder 143, which can be a pulse generator for digitally indicating displacement increments and/or a digitally encoded position indicator, which feeds a micromotion profiler 147 coupled through the servo motor control 145 to the motor 141. The micromotion profiler 147 is coupled through a suitable interface 149 to a programmable controller 131 serving the entire system so that command and position, velocity and/or acceleration signals can be exchanged between profiler 147 and controller 131 to control the motor and indicate the state of the apparatus which it drives. One suitable profiler is a PMI Micromotion Module from PMI MOtors, a division of Kollmorgan Corporation, 5 Aerial Way, Syosset, N.Y.

Motor 141 typically drives a reduction gear 148 which in the case of feed conveyor 32 and its drive motor 126 is coupled through an overriding clutch 139 to a drive chain for rollers 26, 28 and belt conveyor section 31. In the case of main conveyor 33 and its drive motor 123, the typical motor 141 and gearing 148 is coupled to a drive for the conveyor belt 70 forming the deck of the main conveyor 33 and is coupled as by overriding clutch 125 and coupling chain 124 to drive conveyor 32 as a slave to conveyor 33. Thus when main conveyor 33 is driven by its motor and drive 123 feed conveyor 32 is driven and clutch 149 permits motor 126 to remain idle. Conversely, when motor 126 drives feed conveyor 32 clutch 125 permits main conveyor 33 and its drive 123 to remain idle. Each motor control of the conveyor drives 123 and 126 have motor control elements and couplings to the controller 131 as discussed with respect to the typical motor control 140.

As illustrated, a typical motor control system 140 is arranged to drive a pinion 149 such as drive pinion 45 of loader carriage 36 or drive pinion 46 of loader carriage 37. Thus, such motor control systems are illustrated in FIG. 10 as system 150 for carriage 36, 151 for carriage 37, 152 for main conveyor 33 and 133 for feed conveyor 32 all subject to control and coordination of operation as programmed in controller 131. Takeout conveyor motor control is treated as an on-off control 155 subject to control of controller 131.

The ware marker-positioner, lift, chuck and sand blast nozzle are each controlled by solenoid controlled valves as is the coding mechanism drive of the marker. This marker positioner control is subject to command signals from the controller 131 through its control and valve assembly 156.

Loaders 34 and 35 have control modules 157 and 158 supported on carriages 36 and 37 and coupled with motor control systems 150 and 151 to controller 131 by suitable flexible traveling cables 159 and 161. Positive pressure air conduits for pneumatic driving and blow off functions and vacuum conduits can be joined as flexible traveling conduits with traveling cables 159 and 161 to feed the actuating cylinders and vacuum cups of loaders 34 and 35 at all positions of their traverse. Control modules 157 and 158 each include solenoid actuated valves for vacuum and blow off air to the vacuum cups 57, 76, 90 and 91, for the pneumatic drive valves for vacuum head drive cylinders 55, 75, 87 and 95 and for lift cylinders 79 and 110.

Each grinder 21 has a control 162 for operating the grinder and the solenoid for chuck orientation in response to signals from controller 131. Control 162 also provides feedback signals of the grinder and chuck state to controller 131.

The several ware sensors are also cabled to the controller 131 to actuate appropriate responses through the controller control. Thus, in FIG. 10, ware sensor 132 at the cradle loader signals the presence of a panel at the ware marker-positioner and controller 131 responds by actuating a marker lift.

It is to be appreciated that the apparatus disclosed and its method of operation lend themselves to many variations and applications. While the products operated upon are faceplates of panels of CRTs, it is to be appreciated that other products which are to be distributed to a number of like processing stations could be manipulated to such stations employing features of his system. Further, the grinder machine work stations can be of different form from those shown and other forms of work stations could be loaded and unloaded with apparatus according to this inventions. While the timed functions of the loaders are shifted in phase in the described operation, they can be operated in phase provided their pick up functions occur when work pieces on the conveyors are stationary. The system can be applied to worklines having greater or fewer work stations than the sixteen illustrated. It can be employed with work stations only on one side of the conveyor. The structure of the elements of the loaders, carriages and conveyors illustrated can be replaced by other structures which perform the functions of this system. In view of the available variations, it is to be understood that this invention description is to be read as illustrative and not in a limiting sense.

I claim:

1. The method of distributing workpieces to predetermined delivery stations spaced at regular intervals along a path comprising:

designating each workpiece for odd or even stations spaced along said path in spatial sequence;

delivering workpieces to a feed conveyor which extends to a main conveyor at a location between the first and second stations in sequence;

advancing delivered odd workpieces on the feed conveyor arranged to index one interval;

advancing delivered even workpieces on the combination of the feed conveyor and a tandem related main conveyor each arranged to index two intervals in combination;

and alternately and cyclically performing the said steps of advancing the feed conveyor or interval and the feed and main conveyors two intervals to position, following the combined advance of both the one interval and the two interval advancing steps, odd designated workpieces on the conveyors at odd delivery stations and even designated workpieces on the conveyors at even delivery stations for each advancing cycle.

2. The method of distributing workpieces according to claim 1 including the steps of designating each workpiece for an individual delivery station; and removing a designated workpiece from the path at the individual delivery station in the sequence of the delivery stations for which it was designated following the combined advance of both the one interval and two interval advancing steps.

3. The method of distributing workpieces according to claim 2 including the step of returning a designated workpiece to the path at the delivery station displaced two intervals subsequent in the sequence of delivery stations along the path to the individual delivery station from which the workpiece was removed; and transferring each workpiece from the main conveyor at a location beyond the predetermined delivery stations.

4. The method of distributing workpieces according to claim 2 wherein a finite number (n) of delivery stations are spaced along the path wherein the step of designating workpieces is performed in a repetitive cycle to designate workpieces for individual delivery stations in the order of the spatial sequence of delivery stations along the path, and the step of removing a workpiece designated for a given individual delivery station from the path at the given individual delivery station is repeated each $n^{th}$ removal step following the preceding removal of a workpiece at such given delivery station.

5. The method of distributing workpieces according to claim 4 including the steps of returning a designated workpiece to the path at the individual delivery station displaced two intervals subsequent in the sequence of delivery stations along the path to the individual delivery station from which the workpiece was removed $N+2$ removal steps following the removal of such workpiece from the path; and transferring each workpiece from the main conveyor at a location along the path and beyond the predetermined delivery stations.

6. The method of distributing workpieces according to claim 2 wherein the path is linear and a finite number (n) of delivery stations are spaced equally along the path; wherein the workpieces are removed at the delivery stations to a first side of the path for a leading delivery station and a second side of the path for a following delivery station at delivery stations spaced $N/2$ intervals.

7. The method of distributing workpieces according to claim 6 including the steps of returning designated workpieces to the path at the delivery stations displaced two intervals from the individual delivery station from which the workpieces were removed from the path.

8. The method if distributing workpieces to predetermined delivery locations spaced at regular intervals along a path comprising:

designating each workpiece for odd or even delivery locations spaced along the path in spatial sequence;

initially advancing designated odd workpieces one interval along the path;

initially advancing designated even workpieces two intervals along the path;

advancing simultaneously all workpieces, which are along the path and which previously have been initially advanced, two intervals along the path in conjunction with each of said steps of initially advancing designated even workpieces two intervals along the path;

and alternately and cyclically performing the said steps of initially advancing designated odd workpieces and initially advancing designated even workpieces to position, between said advancing steps, designated odd workpieces at odd delivery locations along the path and designated even workpieces at even delivery locations along the path.

9. The method of distributing workpieces according to claim 8 including the steps of designating each workpiece for an individual delivery location, and removing a designated workpiece from the path at the delivery location for which that workpiece was designated between the successive steps of advancing workpieces two intervals along the path.

10. The method of distributing workpieces according to claim 9 including the step of returning each of the workpieces removed from the path to the delivery locations along the path displaced two intervals in the advance direction from the individual delivery locations from which the workpieces were removed between the successive steps of advancing workpieces two intervals along the path.

11. The method of distributing workpieces according to claim 9 wherein a finite number (n) of delivery locations are spaced along the path wherein the step of designating workpieces is performed in a repetitive cycle to designate workpieces for individual delivery locations in the order of the spatial sequence of delivery locations along the path, and the step of removing a workpiece designated for a given individual delivery station from the given individual delivery location is repeated each $n^{th}$ removal step following the preceding removal of a workpiece at such given delivery location.

12. The method of distributing workpieces according to claim 11 including the steps of returning a designated workpiece to the path at the delivery location displaced two intervals subsequent in the sequence of delivery locations along the path to the individual delivery location from which the workpiece was removed n+2 removal steps following the removal of such workpiece from the path; and transferring each workpiece from the path at a location beyond the predetermined delivery stations.

13. The method of distributing workpieces according to claim 9 wherein the path is linear and includes a finite number (n) of delivery locations spaced equally along the path; wherein the workpieces are moved at the delivery locations to a first side of the path for a leading delivery location and a second side of the path for a following delivery location at delivery locations spaced $n/2$ intervals from the leading delivery locations.

* * * * *